US011965771B2

United States Patent
Barreto et al.

(10) Patent No.: US 11,965,771 B2
(45) Date of Patent: Apr. 23, 2024

(54) BEVERAGE REFRIGERATOR WITH SYSTEM AND METHODS FOR WEIGHT DETECTION, INVENTORY MONITORING, AND OVERLOAD CONDITION NOTIFICATION

(71) Applicant: WHIRLPOOL CORPORATION, Benton Harbor, MI (US)

(72) Inventors: Eduardo Maldaun Barreto, Joinville (BR); Vinicius Bianchezzi, Joinville (BR); Rafael Bolzan, Joinville (BR); Neomar Giacomini, St. Joseph, MI (US); Veronica Marin, Joinville (BR); Jucemar Medeiros, Joinville (BR); Wendel O. Rossi, Joinville (BR); Rafael Kiemo Pfau Santos, Joinville (BR); Marcos Aurelio de Souza, Joinville (BR); Gustavo Racy, Eindhoven (NL)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 1027 days.

(21) Appl. No.: 16/366,348

(22) Filed: Mar. 27, 2019

(65) Prior Publication Data
US 2019/0301923 A1 Oct. 3, 2019

Related U.S. Application Data

(60) Provisional application No. 62/650,479, filed on Mar. 30, 2018.

(51) Int. Cl.
*G01G 19/414* (2006.01)
*F25D 23/00* (2006.01)
(Continued)

(52) U.S. Cl.
CPC .......... *G01G 19/414* (2013.01); *F25D 23/00* (2013.01); *F25D 29/005* (2013.01);
(Continued)

(58) Field of Classification Search
CPC .... G01G 19/414; G01G 23/002; G01G 19/42; F25D 23/00; F25D 29/005;
(Continued)

(56) References Cited

U.S. PATENT DOCUMENTS

| 2,803,510 A * | 8/1957 | Carbary ................. F24C 15/08 16/34 |
| 4,419,734 A | 12/1983 | Wolfson et al. |
| 4,891,755 A | 1/1990 | Asher |
| 5,728,999 A | 3/1998 | Teicher |
| 7,416,119 B1 * | 8/2008 | Inderrieden .............. G07G 1/14 235/383 |

(Continued)

FOREIGN PATENT DOCUMENTS

| CN | 105042997 A * | 11/2015 | .......... F25D 27/005 |
| CN | 205227972 U * | 5/2016 | |
| JP | 5720704 B2 * | 5/2015 | |
| JP | 2019003399 A * | 1/2019 | |

*Primary Examiner* — Ariel J Yu
*Assistant Examiner* — Denisse Y Ortiz Roman
(74) *Attorney, Agent, or Firm* — Price Heneveld LLP

(57) ABSTRACT

A refrigerator includes a cabinet defining an exterior configured for resting on a surface and an interior and a plurality of feet coupled with the cabinet along a bottom surface thereof. The refrigerator also includes a plurality of load transducers disposed between and in opposing contact with the cabinet and respective ones of the feet. The refrigerator further includes electronic circuitry including a non-transitory computer-readable medium configured to receive a signal corresponding with a gross weight of the cabinet from the plurality of load transducers and to determine the quantity of articles retained within the interior of the cabinet.

20 Claims, 23 Drawing Sheets

(51) Int. Cl.
*F25D 29/00* (2006.01)
*G06Q 10/087* (2023.01)

(52) U.S. Cl.
CPC ..... *G06Q 10/087* (2013.01); *F25D 2331/803* (2013.01); *F25D 2331/805* (2013.01); *F25D 2400/38* (2013.01); *F25D 2500/06* (2013.01); *F25D 2700/06* (2013.01)

(58) Field of Classification Search
CPC ......... F25D 2331/803; F25D 2331/805; F25D 2400/38; F25D 2500/06; F25D 2700/06; F25D 31/007; F25D 23/003; G06Q 10/087
USPC .......................................................... 705/28
See application file for complete search history.

(56) References Cited

U.S. PATENT DOCUMENTS

| | | | |
|---|---|---|---|
| 7,557,310 | B2 | 7/2009 | Lai et al. |
| 9,373,164 | B2 | 6/2016 | Lee et al. |
| 10,638,855 | B2* | 5/2020 | Cichuta ............... A47F 3/02 |
| 2007/0119195 | A1* | 5/2007 | Meredith ............ F25D 29/00 62/137 |
| 2007/0162182 | A1* | 7/2007 | Marti ................ G07F 9/026 221/6 |
| 2008/0103939 | A1 | 5/2008 | Gibb |
| 2015/0153217 | A1* | 6/2015 | Dillon ............... G07F 9/001 177/1 |
| 2016/0242558 | A1* | 8/2016 | Rawls-Meehan ...... A61G 7/018 |
| 2017/0363348 | A1* | 12/2017 | Bogrash .............. G06K 7/1413 |
| 2018/0325318 | A1* | 11/2018 | De' Longhi ........ A47J 37/1261 |

* cited by examiner

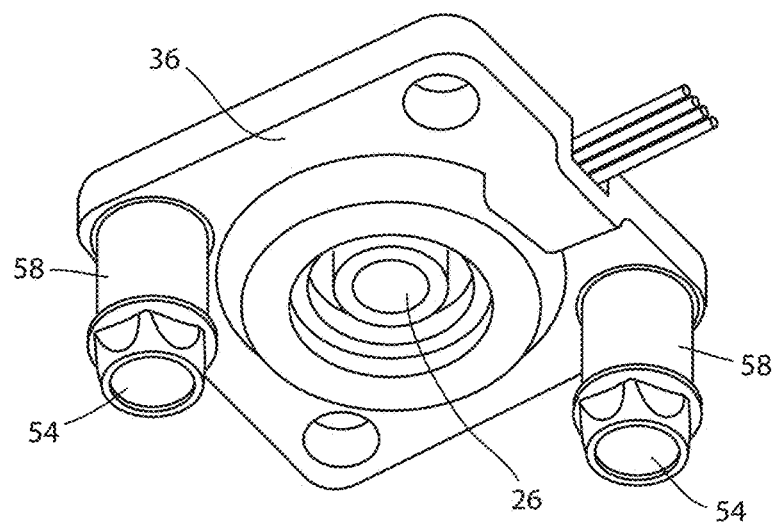
FIG. 6
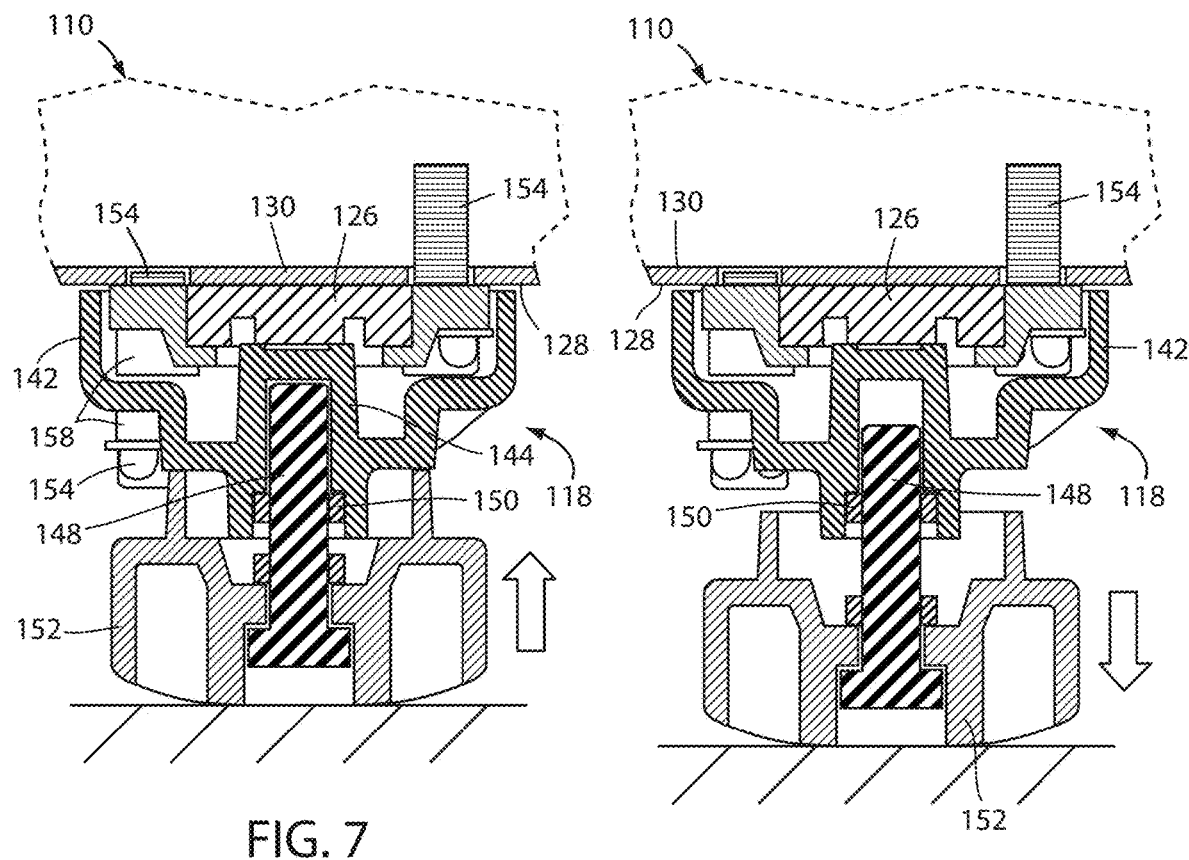
FIG. 7
FIG. 8

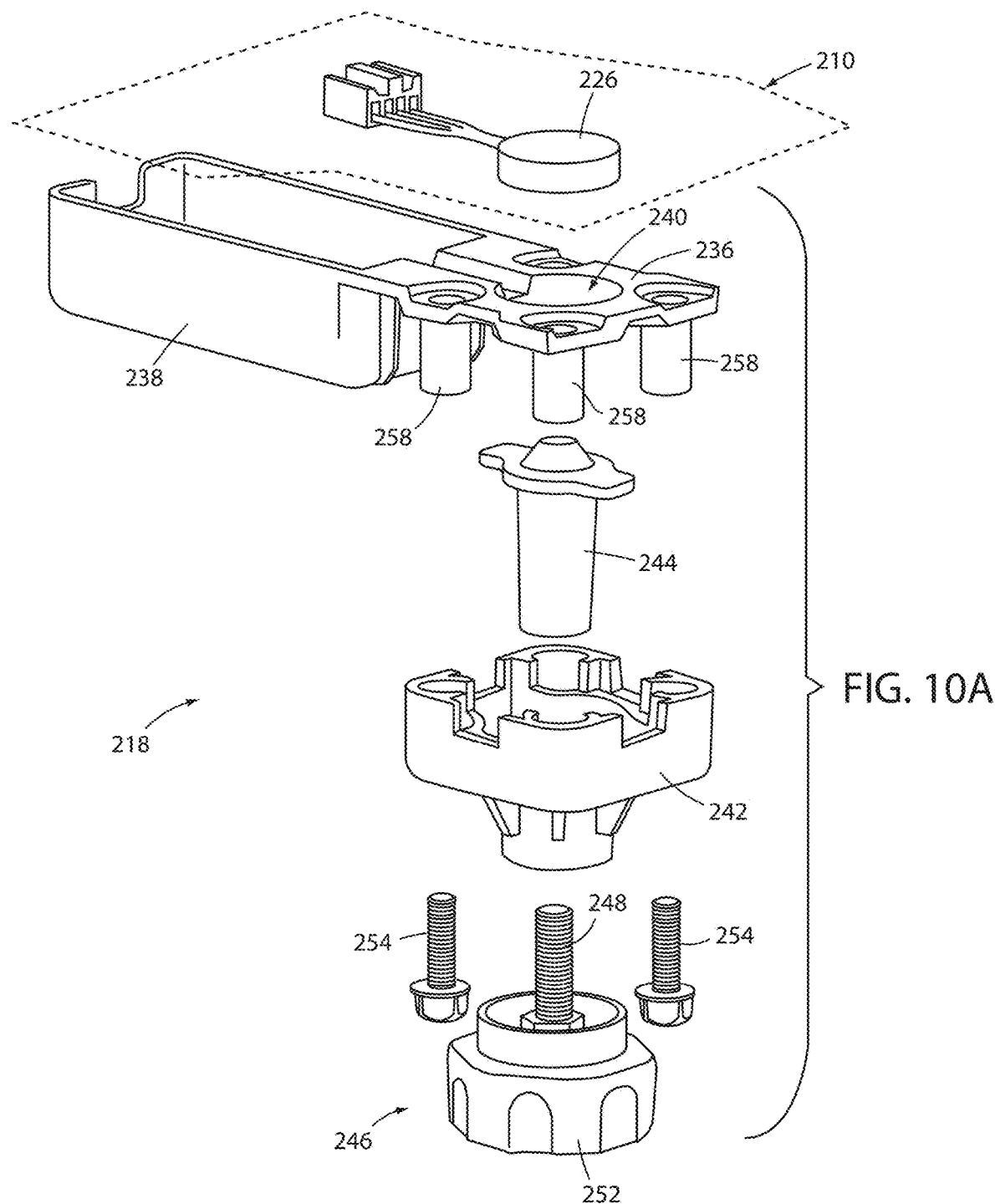

BEVERAGE REFRIGERATOR WITH SYSTEM AND METHODS FOR WEIGHT DETECTION, INVENTORY MONITORING, AND OVERLOAD CONDITION NOTIFICATION

CROSS-REFERENCE TO RELATED APPLICATIONS

This application claims priority to and the benefit under 35 U.S.C. § 119(e) of U.S. Provisional Patent Application No. 62/650,479, filed on Mar. 30, 2018, entitled BEVERAGE REFRIGERATOR WITH SYSTEM AND METHODS FOR WEIGHT DETECTION, INVENTORY MONITORING, AND OVERLOAD CONDITION NOTIFICATION, the entire disclosure of which is hereby incorporated herein by reference.

FIELD OF THE INVENTION

The present device generally relates to a refrigerator with load detection capability. In particular, the refrigerator includes adjustable feet with integrated load sensors and integrated capability to monitor a beverage inventory of the refrigerator contents using the load sensors, as well as to communicate an overload condition of the refrigerator.

BACKGROUND

Various inventory control systems are known for tracking the weight of contents of a refrigerator. In one example, a refrigerator is intended for storing beer or other liquids in various types of containers and can provide an estimate of the content weight stored therein by subtracting an estimated container weight from an actual measured weight (of the refrigerator and contents, where the refrigerator weight is known and also subtracted). An inventory control system that tracks the types of beverage articles and the fluid volumes of beverages in a refrigerator is desirable. It is also desirable for a user to be able to communicate with the inventory control system to indicate beverage preferences and to confirm beverage contents. Further, it is desirable to have an inventory control system that provides a user information about the types of beverage articles in the refrigerator and the fluid volumes of beverages in the refrigerator by receiving inputs from refrigerator weight measuring assemblies that are processed by a behavior routine and a classification routine.

SUMMARY

In at least one aspect, a refrigerator includes a cabinet defining an exterior configured for resting on a surface and an interior, a plurality of feet coupled with the cabinet along a bottom surface thereof, a plurality of load transducers disposed between the cabinet and respective ones of the feet, and electronic circuitry including a non-transitory computer-readable medium configured to receive a signal corresponding with a gross weight of the cabinet from the plurality of load transducers and to determine a quantity of articles retained within the interior of the cabinet.

In a further aspect, an inventory control system for a refrigerator comprises a cabinet defining an exterior configured for resting on a surface and an interior, one or more feet coupled with the cabinet along a bottom surface thereof, one or more load transducers disposed between and in opposing contact with the cabinet and respective ones of the one or more feet, and electronic circuitry including a non-transitory computer-readable medium configured to receive a detection of an inventory change inside of the refrigerator and to access a stock memory to generate an output indicative of a current inventory in the refrigerator.

In another further aspect, a method for determining a refrigerator stock comprises receiving a signal corresponding with a gross weight of a cabinet from a plurality of load transducers coupled with the cabinet along a lower surface thereof, storing in memory operably associated with the refrigerator a quantity of articles within the cabinet, including determining a change in the weight of the cabinet, interpreting the change in the weight of the cabinet as a change in a weight of contents within the cabinet, increasing the quantity of articles when the change in the weight of the contents increases by a predetermined amount, and decreasing the quantity of articles when the change in the weight of the contents decreases by a predetermined amount, and communicating a current value of the quantity of articles via an interface operably associated with the refrigerator.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 6 is a perspective view of a mounting block and load transducer included in the assembly of FIG. 3;

FIG. 7 is a further cross-sectional view of the assembly of FIG. 3;

FIG. 8 is a cross-sectional view of the assembly of FIG. 7 with a foot thereof in an extended condition;

FIG. 10A is an exploded view of a further alternative weight sensing assembly;

DETAILED DESCRIPTION OF EMBODIMENTS

Figure 1:
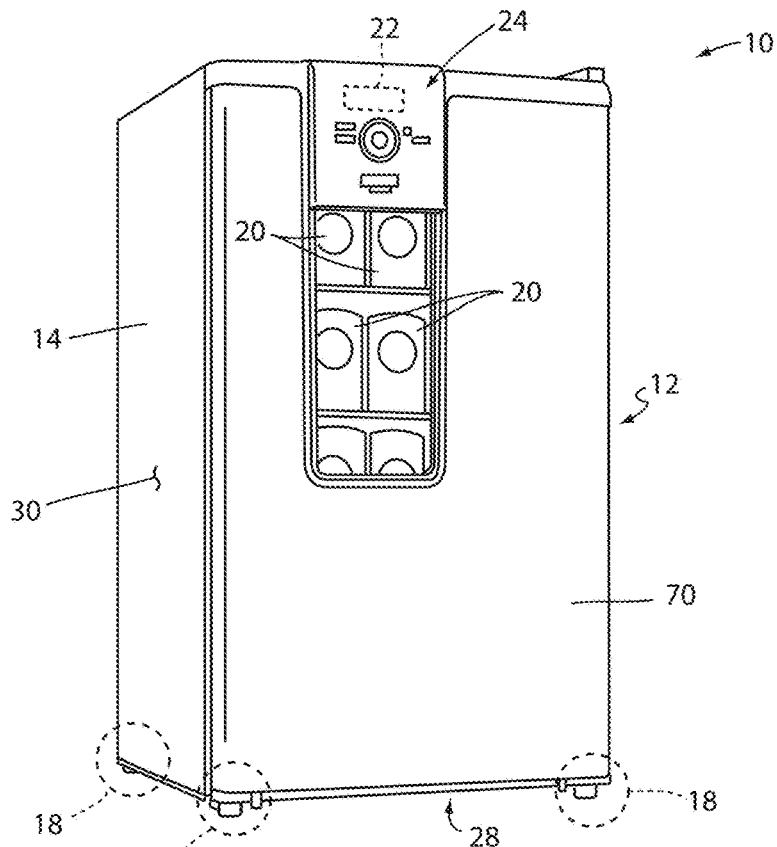
FIG. 1 is a refrigerator according to an aspect of the disclosure.
Figure 2:
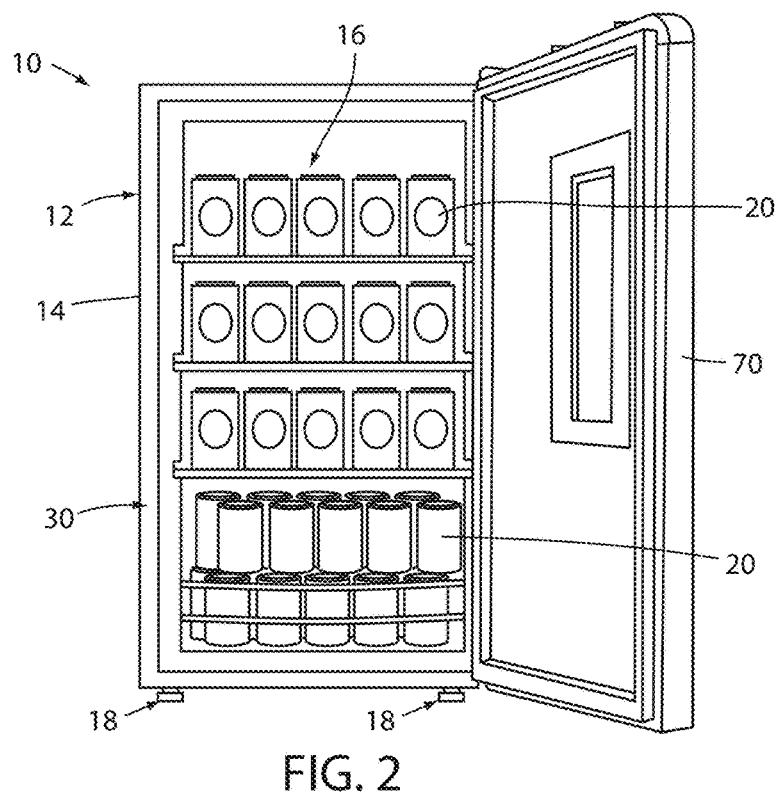
FIG. 2 is the refrigerator of FIG. 1 in an open condition.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. With reference to the element numbers used herein to describe the drawings, unless otherwise specified, similar numbers may refer to similar features.

Referring to the embodiment illustrated in FIG. 1, reference numeral 10 generally designates a refrigerator. Refrigerator 10 includes a cabinet 12 defining an exterior 14 configured for resting on a surface and an interior 16. Refrigerator 10 further includes a plurality of feet 32 coupled with the cabinet 12 along a bottom surface 28 thereof, a plurality of load transducers 26 disposed between and in opposing contact with the cabinet 12 and respective ones of the feet 32. Refrigerator 10 also includes electronic circuitry including a non-transitory computer-readable medium configured to receive a signal corresponding with a gross weight of the cabinet 12 from the plurality of load transducers and to determine the quantity of articles retained within the interior of the cabinet. The gross weight of the cabinet 12 is measured from the load transducers 26 disposed between and in opposing contact with the cabinet 12 and respective ones of the feet 32. The gross weight of the cabinet 12 accordingly includes the structural weight of the cabinet 12, the weight of contents placed in the cabinet 12, and the weight of contents that are external to the cabinet 12. The structural weight of the cabinet 12 refers to the empty weight of the cabinet 12. The gross weight of the cabinet 12, thusly, is meant to exclude anything below the load transducers 26.

In one aspect, the refrigerator 10 may be generally intended and adapted for storing of packaged beverages, including bottles and cans of beer (although other packaged beverage items of similar uniform sizes can also be stored in refrigerator 10, as described herein). In a further aspect, the refrigerator 10 can be an internet-connected beverage refrigerator that is capable of identifying the quantity and types of beverage containers stored in interior 16. Such type and quantity identification can be carried out by refrigerator 10 obtaining a weight measurement of the combined cabinet 12 and the articles 20 in the form of beverages in generally identifiable containers placed or otherwise stored in interior 20. Such a refrigerator 10 can notify one or more users of the identified information via an integrated human-machine interface ("HMI") or a mobile device application by way of an internet connection. As discussed further below, the present refrigerator 10 obtains a gross load measurement by actuating load cell sensors 26 (included in the above-mentioned means for determining a gross weight of the cabinet 12 and a plurality of articles 20) positioned along a lower surface 28 of the outer wrapper of cabinet 12. As discussed further below, a characterization routine included as a part of the above-mentioned means 22 for determining the quantity of the plurality of articles 20 can translate load data into a quantity of such articles, in particular a number of stored beverages (e.g. bottles and/or cans of beer). Further, such type and quantity identification can allow refrigerator 10 to provide an acceptably accurate estimate of the fluid weight of the beverages stored therein by subtracting an estimated container weight from the gross weight of the cabinet 12 where the weight of an empty cabinet 12 and contents that are external to the cabinet 12 are also subtracted), as discussed further below. In various aspects the container weight can be estimated by one of user input, an internal vision system, or inference based on a total weight of an item or items identified as being placed within interior 16 at a single instance.

Figure 3:
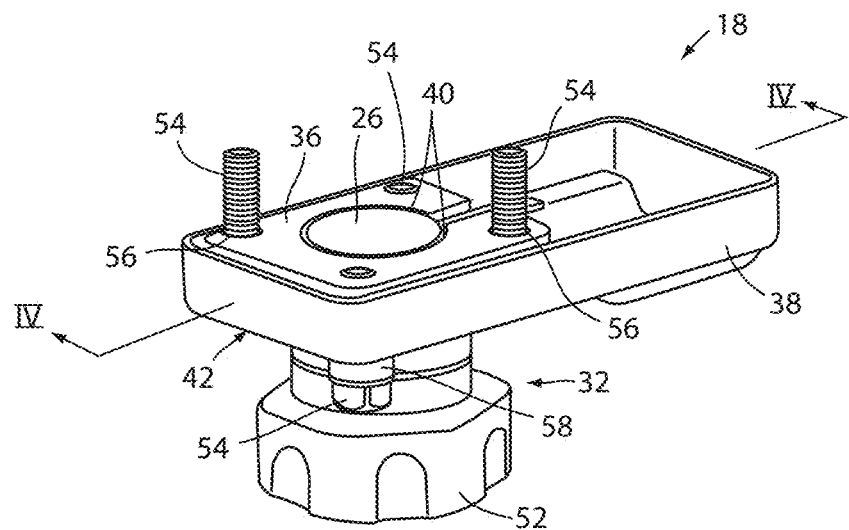
FIG. 3 is a perspective view of weight sensing assembly included in the refrigerator of FIG. 1.

Turning to FIGS. 1-5 a plurality of weight sensing assemblies 18 are assembled with cabinet 12 and include a plurality of feet 32 coupled with the cabinet 12 along the lower surface 28 of the exterior wrapper 30. As depicted, a plurality of sensors 26 in the form of load transducers disposed between and in opposing contact with the cabinet 12 and respective ones of the feet 32. In this manner, weight sensing assemblies 18 collectively transfer weight reactions from the ground on which refrigerator 10 is placed to the respective load cells 26 to provide the information that enables the refrigerator 10 to identify the amount of beverage (by quantity, weight, etc.) stored therein. As shown in FIG. 3, the assemblies 18 include load cell sensor 26, a mounting block 36, the load cell 26, a cover 38, and a foot 32. As shown, four weight sensing assemblies 18 are included in refrigerator 10 to stably support cabinet 12 on a surface.

Figure 4:
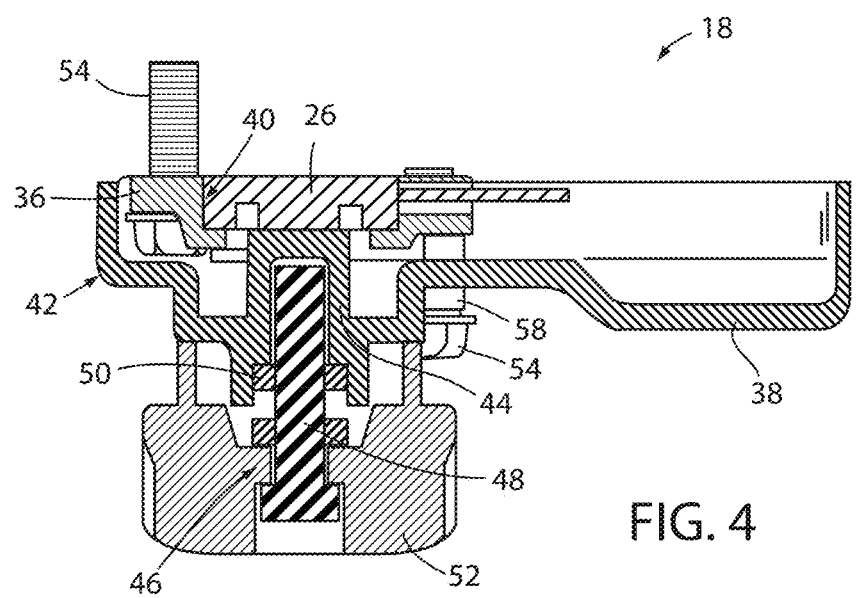
FIG. 4 is a cross-sectional view of the assembly of FIG. 3.
Figure 5:
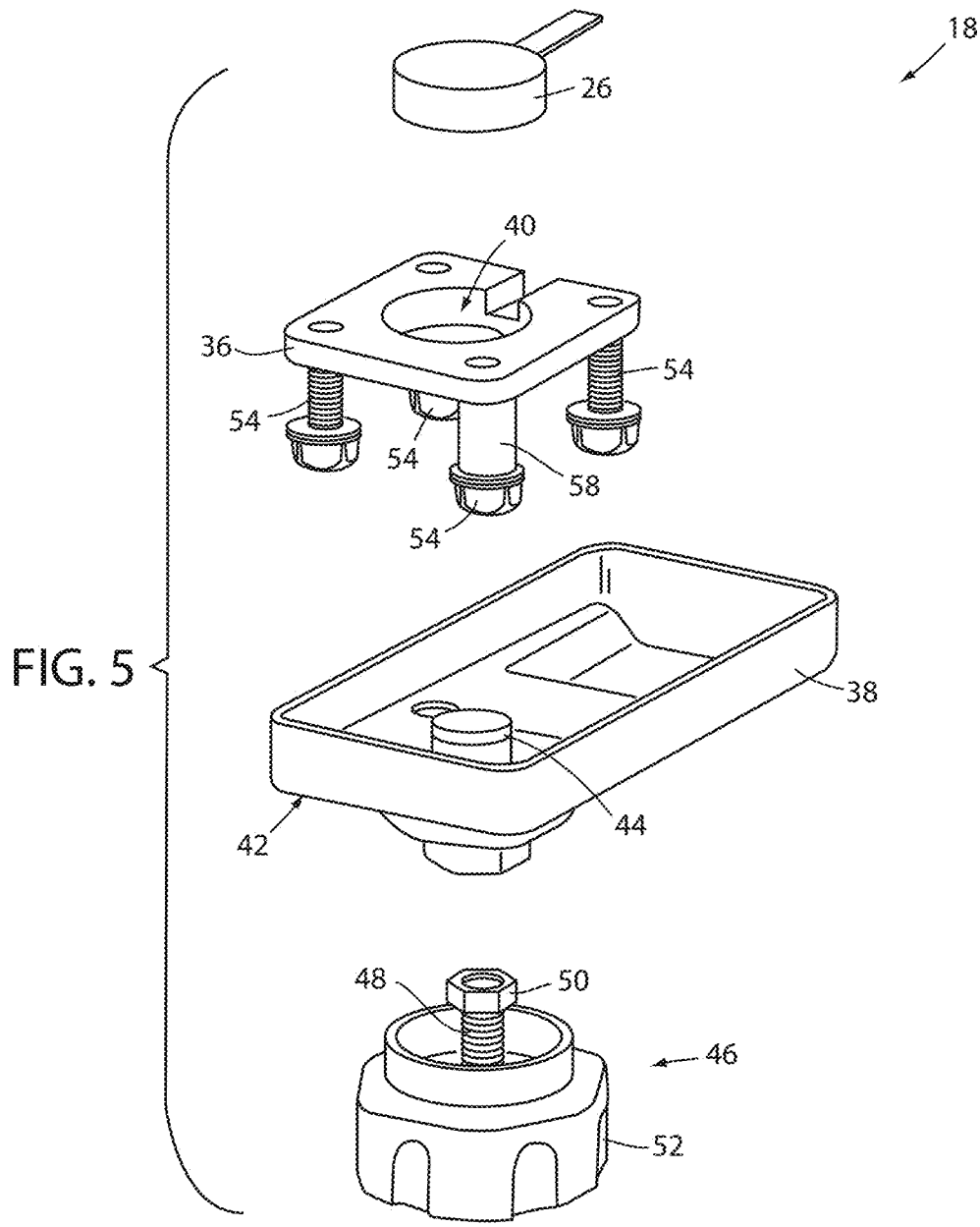
FIG. 5 is an exploded view of the assembly of FIG. 3.

As shown in FIGS. 3 and 4, the mounting block 36 retains the sensor 26 in an upper cavity 40 of mounting block 36.

In this manner, mounting block 36 can be coupled with the wrapper 30 along the lower surface 28 thereof (such as on a respective corner or cabinet 12) and can, thusly retain sensor 26 in a desired position along lower surface 28. Additionally, assembly 18 includes a supporting unit 42 that combines the above-mentioned cover 38 (that houses the wiring and connections associated with sensors 26) with an adjustment sleeve associated with the foot 32 of assembly 18. As illustrated, sleeve 44 retains the lower portion 46 of foot 32 in an adjustable manner, achieved by including internal threads within sleeve 44 (by way of integrated threading or a bolt 48 received therein). In this manner, sleeve 44 may receive a threaded stem 48 with a caster 52 coupled therewith, such that rotation of lower foot portion 46 lengthens the vertical distance between sleeve 44 and caster 52, thereby allowing adjustment of foot 32. In turn, sleeve 44 is coupled in a fixed latitudinal and longitudinal position with respect to bottom 28 of cabinet 12, while being permitted to move vertically (i.e. toward and away from lower surface 28) into contact with the respective load sensor 26, as can be seen in FIG. 4. In this manner, foot 32, regardless of the adjusted height position thereof, can transfer the vertical load on caster 52 from the underlying surface to the respective load sensor 26. Accordingly, the total (structural) weight of cabinet 12 and any contents placed in the cabinet 12 and/or external to the cabinet 12 can be determined by a sum of the loads on all of the sensors 26 from each of the respective feet 32.

In the present embodiment, mounting block 36 includes four bolts 54 coupled therewith and extending therefrom in a direction away from lower surface 28. As further shown, the bolts 54 pass through respective holes 56 in supporting unit 48 with which sleeve 44 is coupled (including by sleeve 44 being integral with supporting unit 48, as shown). In this manner, bolts 54 can be sized and/or positioned with respect to mounting block 36 to retain sleeve 44 in an assembled condition with respect to mounting block 36 but to not be tightened against sensor 26. Accordingly, sleeve 44 is permitted to move vertically, as discussed above to transfer the load thereon to sensor 26. In the present arrangement, one or more bolts 54 can be received within an extended bosses 58 (shown in FIG. 6) on mounting block 36, which may be sized to retain supporting unit 48, as discussed above, while fitting closely (but not tightly) within the respective one of holes 56 to retain sleeve 44 in the desired aligned position with respect to sensor 26. The arrangement, thus described, can be adapted for use with different types of load cells, including by modifying the shape of the supporting unit 42 and the cover 38 coupled therewith, while reflecting the same principles of the illustrated arrangement. As shown cover 38 may conceal and/or protect any wiring or connections extending from sensor 26 and may be integral with supporting unit 42.

Figure 9:
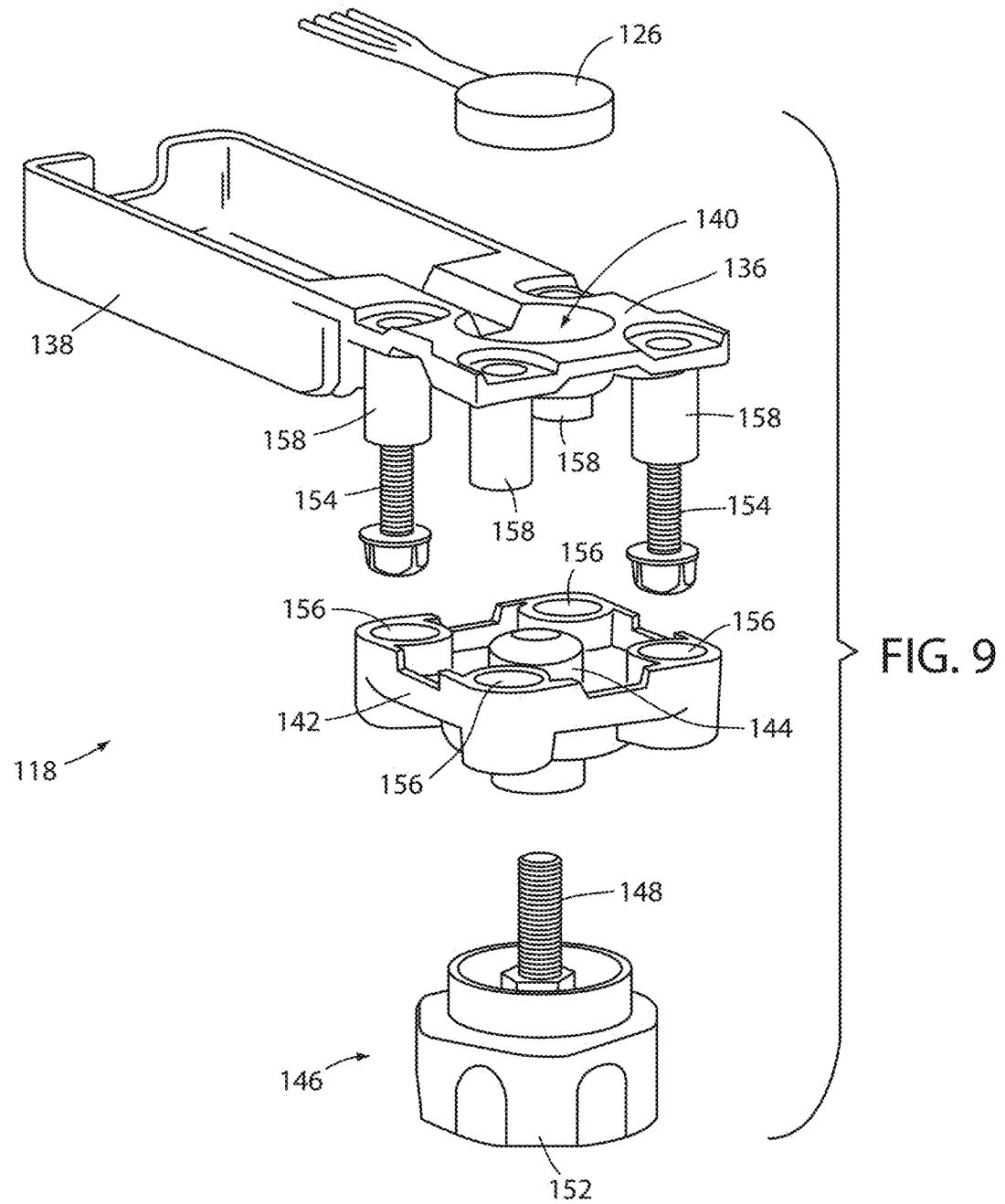
FIG. 9 is an exploded view of an alternative weight sensing assembly.

Turning to FIGS. 7-9, an alternative embodiment of a weight sensing assembly 118 is illustrated in connection with a portion of a refrigerator 110 that may be otherwise similar to refrigerator 10, discussed above. In the current arrangement, cover 138 is integral with and extends from mounting block 136. As further shown, supporting unit 142, accordingly, does not have a cover associated therewith, but rather only includes sleeve 144 of foot 132 integral therewith and holes 156 for receiving bosses 158 (of which four are illustrated) to maintain the desired positioning of the sleeve 144 relative to sensor 126, as discussed above (including by retention using bolts 154). Lower foot portion 146 is adjustably coupled with sleeve 144, as discussed above, such that the load on caster 152 is applied on sensor 126.

In yet another embodiment of weight sensing assembly 218 shown in FIG. 10A, also in connection with a portion of a refrigerator 210 that may be otherwise similar to refrigerator 10, discussed above, sleeve 244 is slidably received in supporting unit 242. In turn supporting unit 242 is fixedly coupled with mounting block 236 (which includes cover 238 integrally formed therewith, as discussed above). The slidable movement of sleeve 244 with supporting unit 242 provides the above-mentioned vertical movement and lateral and longitudinal retention of sleeve 242 with respect to sensor 226. As discussed above, weight sensing assemblies 118 and 218 can be adapted to work with different shapes and types of sensors 126 and 226, while conforming to the principles discussed above.

Figure 10B:
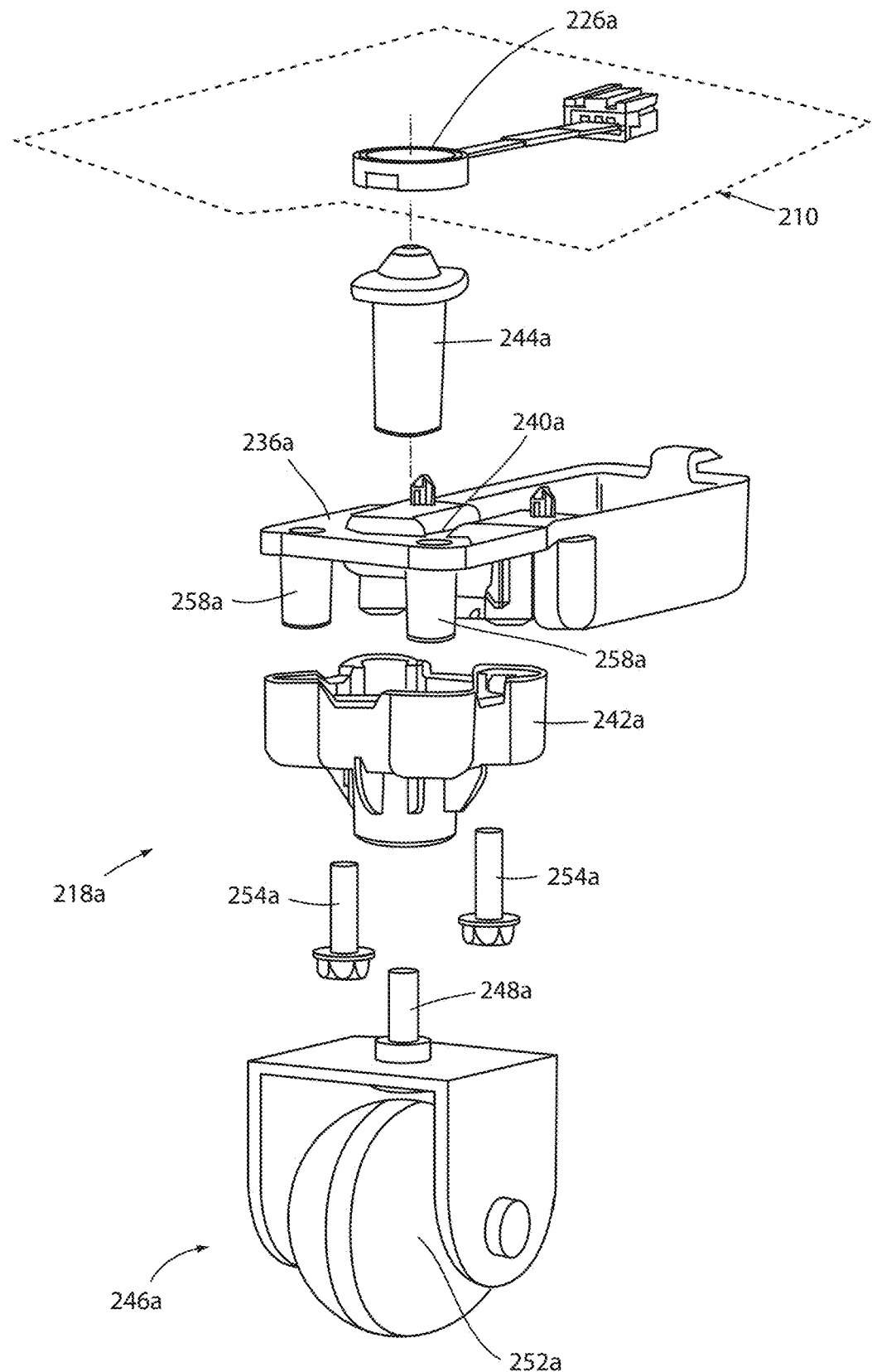
FIG. 10B is an exploded view of a further alternative weight sensing assembly.

Referring to FIG. 10B, an embodiment of a weight sensing assembly 218a with a lower foot portion 246a having a caster 252a is shown. The caster 252a may be attached to the supporting unit 242a with a threaded stem 248a and bolts 254a. The supporting until 242a may be fixedly coupled to a mounting block 236a. A slidable sleeve 244a may be received in the mounting block 236a and the supporting unit 242a. The sensor 226a may be disposed above the slidable sleeve 244a. It is noted that all of the above-described weight sensing assemblies 18,118,218 the lower foot portion 46,146,246 can be replaced with a similar caster, a spherical version of a caster which may be configured to allow for adjustment thereof or a nonadjustable variation with a non-threaded stem received in a snap or press-fit engagement with sleeve 44,144,244. Such variations can allow for the corresponding refrigerator 10,110, 210 to be easily moved, when desired and can be useful in connection when refrigerator 10,110,210 becomes weighted down with heavy liquid contents.

It is contemplated that in various embodiments one or more weight sensing assemblies 18,118,218, 218a may be assembled with cabinet 12 and including one or more feet 32 coupled with the cabinet 12 along the lower surface 28 of the exterior wrapper 30 thereof. It is also contemplated that in various embodiments a single weight sensing assembly 18, 118, 218, 218a may be assembled with cabinet 12.

Figure 11A:
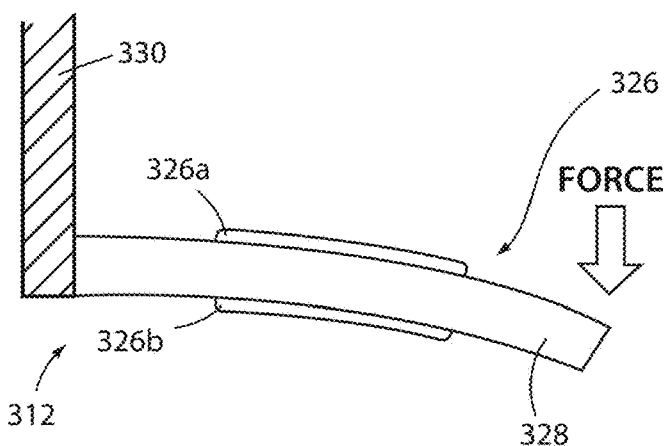
FIG. 11A is a side view of a portion of a refrigerator cabinet including a strain gauge thereon.
Figure 11B:
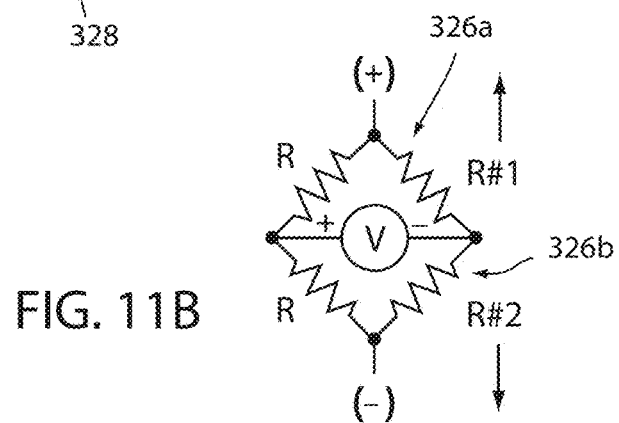
FIG. 11B is a schematic depiction of the strain gauge of FIG. 11A.
Figure 12:
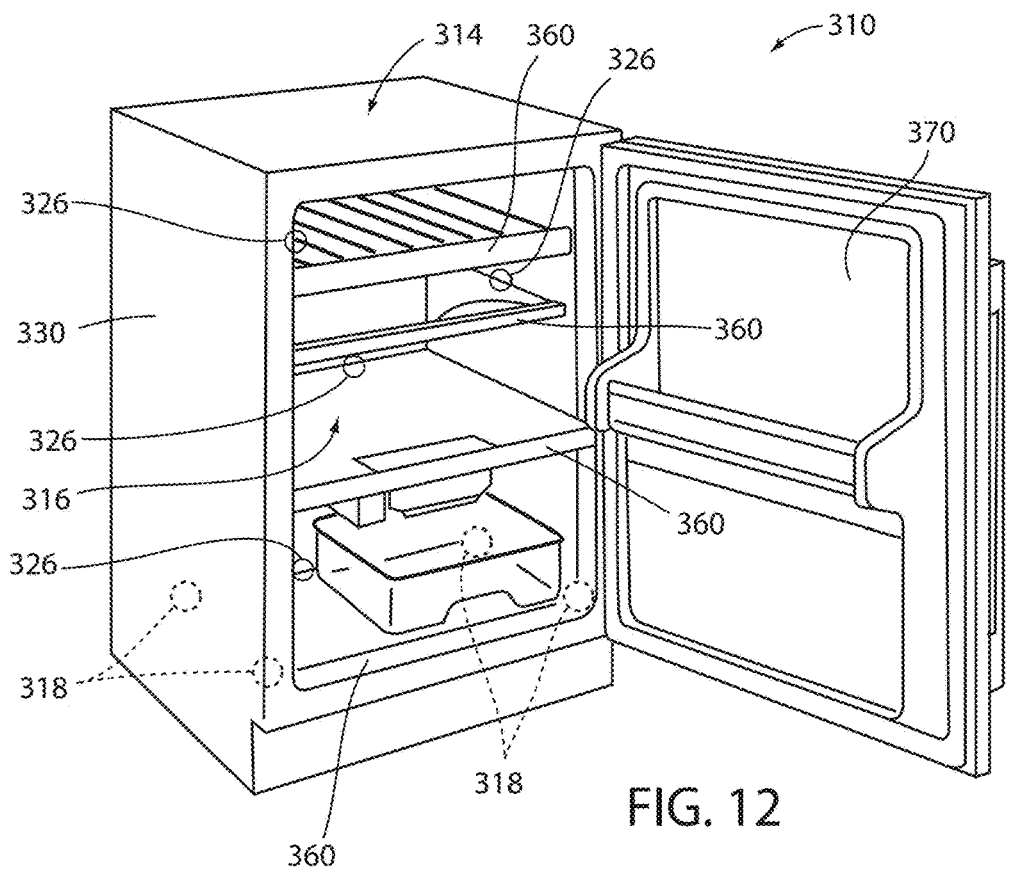
FIG. 12 is a perspective view of a refrigerator including a strain gauge according to a further aspect of the disclosure.
Figure 13:
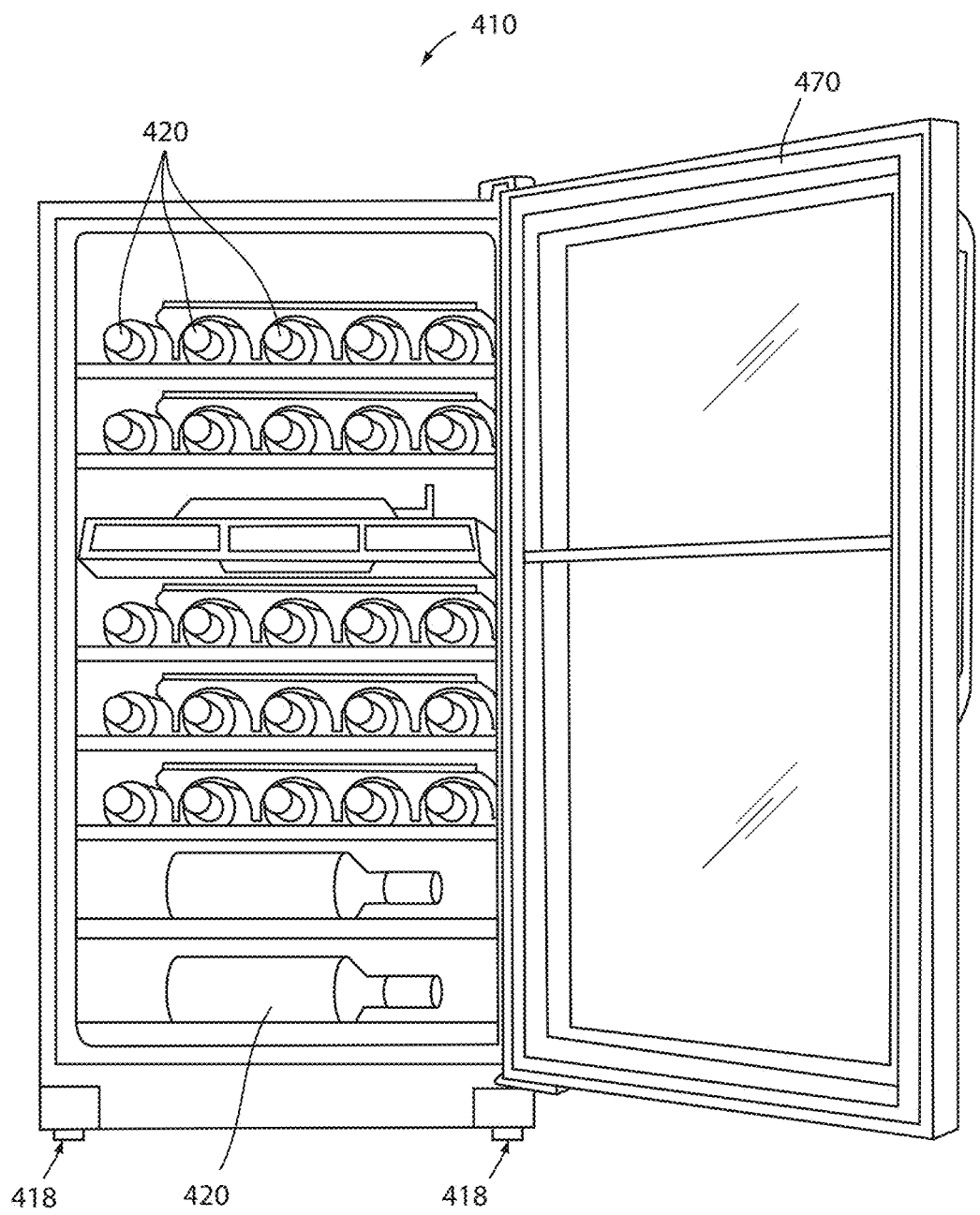
FIG. 13 is a perspective view of a refrigerator according to a further aspect of the disclosure.

Turning to FIGS. 11A, 11B, and 12, an alternative variation of a refrigerator 310 can incorporate one or more strain gauges 326 strategically positioned within or on cabinet 312 to determine the weight of the contents of the refrigerator. In one aspect, such strain gauges 326 may be positioned along lower surface 328 of wrapper 330 in areas, such as illustrated in FIG. 12, that may be subjected to strain due to loading of refrigerator 310, such as adjacent to or between feet 332. In such an embodiment feet 332 may be in the form of conventional adjustable feet 332 coupled with wrapper 330. In a variation, each shelf 360 can include one or more strain gauges 326 with refrigerator 310 configured to determine content eight on a shelf-by-shelf basis.

As shown in FIGS. 11A and 11B, strain gauge 326 has multiple components 326a and 326b on opposite sides of the shelf 360 substrate 362. In this manner each component 326a, 326b has a resistance that varies with strain placed thereon, which is achieved by an applied force on substrate 362 causing deflection thereof (thereby elongating sensor 326a and contracting sensor 326b). Strain gauge 326, thusly, converts weight into a change in electrical resistance that can then be measured with a Wheatstone bridge, as depicted schematically in FIG. 11B. A Typical strain gauge resistance range from 30 Ω to 3 kΩ. This resistance may change only a fraction of a percent for the full force range of the gauge. A circuit can be used to convert the small signal from the Wheatstone bridge to an analog input on a microcontroller. In this manner, the microcontroller, or other electronic circuitry, as discussed further below, can be calibrated or otherwise programmed to convert the signal from such a circuit to the gross weight of cabinet 312 and/or to detect and measure changes in the gross weight of the cabinet 12.

In the various embodiments of refrigerator 10, 110, 210, and 310 discussed above and 410 and 510 discussed later herein, with corresponding sensor 26, 126, 226 arrangements or strain gauges 326, the refrigerator 10,110,210,310, 410,510 may be configured for determining a gross weight of the cabinet 12, including any contents in the cabinet and external to the cabinet, by including electronic circuitry having a non-transitory computer-readable medium. In various examples, such electronic circuitry can include a microprocessor or microcontroller and the non-transitory computer-readable medium can include various forms of memory, including those embodied in a computer chip (e.g. RAM, flash, or the like) electronically connected with the microprocessor or microcontroller. In similar aspects, the electronic circuitry can consist of an integrated circuit, an application-specific integrated circuit ("ASIC") or what is referred to generally as a "system on a chip" that includes memory and a microprocessor or microcontroller in a single unit. In this respect, the microprocessor is electronically connected with the various sensors 26 (and/or sensors 126, 226 or strain gauges 326) to receive a signal therefrom and to derive the gross weight of the cabinet 12, including any contents in the cabinet and external to the cabinet, from the signal according to one or more routines stored in the memory. A description of varying processes and features regarding such routine, extensions, and variations thereof is described herein that can be used or included in any the various refrigerators 10,110,210,310,410,510 (and in connection with any of the related components and features discussed herein), unless specifically stated herein. Accordingly, in connection with this description, only refrigerator 10 is referred to and is understood, unless otherwise specified, as encompassing all variations described or mentioned elsewhere herein. Similarly, only sensors 26 and feet 32 are referred to, which is to be understood as encompassing all variations of sensors 126,226, as well as strain gauges 326, at least to the extent that the functionality described herein can be used in connection with any such feature. In this manner, the same or a similar routine may be used by the same microcontroller or the like and stored in the same memory to further derive the quantity of articles 20 within interior 16. In this manner, the refrigerator can be further configured for deriving a quantity of articles using the same electronic circuitry and computer-readable medium as that which is used for determining the gross weight of the cabinet 12 contents, including any in the cabinet and external to the cabinet, as discussed further below.

Figure 16A:
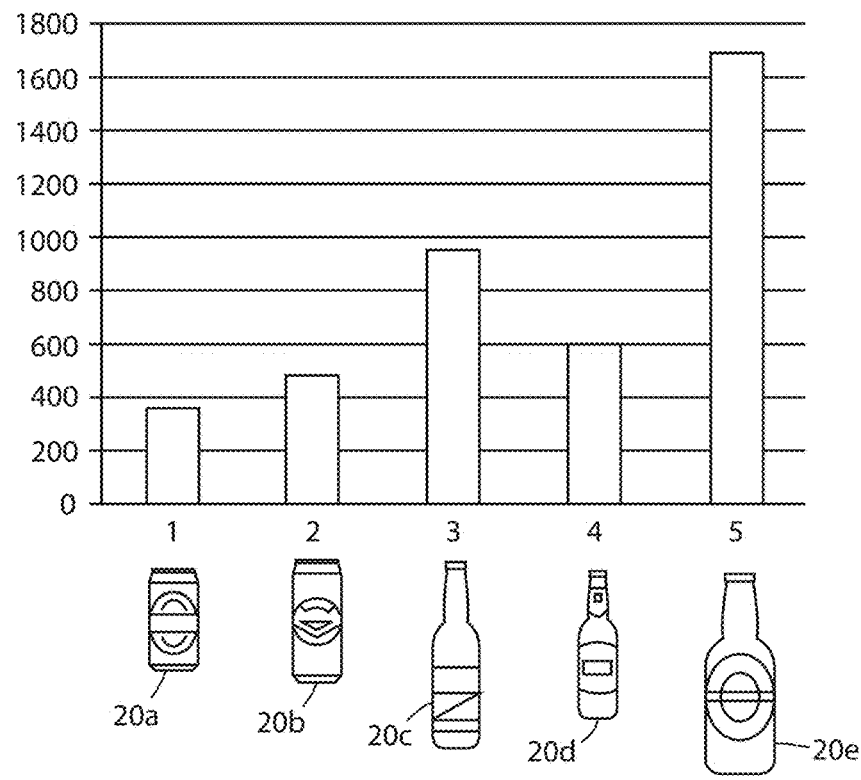
FIG. 16A is a graphical representation of various packaged beverage types and corresponding total weights.
Figure 16B:
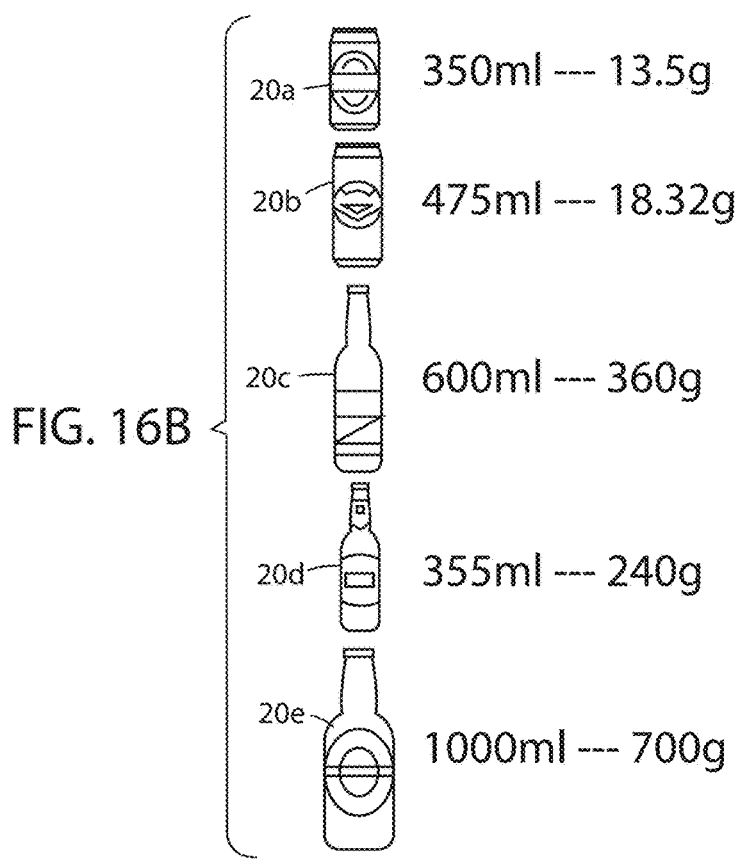
FIG. 16B is a graphical representation of various packaged beverage types and corresponding receptacle weights.
Figure 16C:
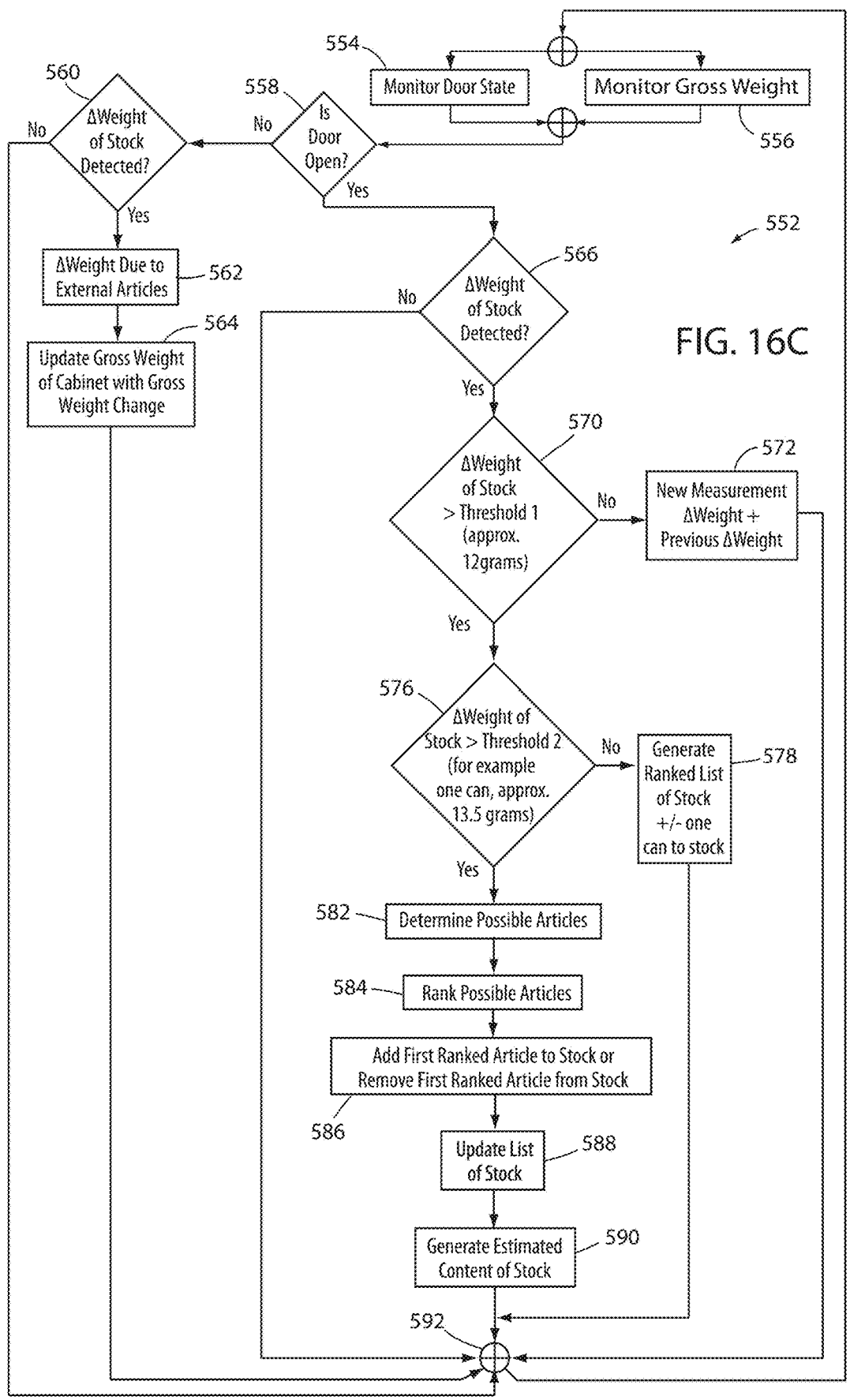
FIG. 16C is a diagram of a general process for determining the stock of an appliance.

In one aspect, the process diagram of FIG. 16C summarizes an exemplary inventory control system of the refrigerator 10, which uses the above described electronic circuitry to determine the gross weight of the cabinet 12 contents, including any in the cabinet and external to the cabinet 12 and quantity of articles within the refrigerator. Aspects of the process shown in the diagram of FIG. 16C are shown in more detail in FIGS. 17A-17G. Referring to FIG. 16C, at step 554 the system monitors the door state. At step 556, the system monitors the gross weight of the cabinet 12. At step 558, the system determines if the door 70 is open. If the door 70 is not open, then the system moves to step 560.

Step 560 determines if a Δ weight of stock has been detected in the cabinet 12 due to the addition or removal of weight on the exterior of the cabinet 12. If the system does not detect a Δ weight of stock at step 560, then the system proceeds to connector 592. If the system detects a Δ weight of the stock at step 560, then the system proceeds to step 562. Step 562 determines Δ weight due to external articles. Step 564 of the system updates the stored gross weight of the cabinet 12 to the current gross weight of the cabinet 12. After step 564, the system continues cycling by resuming monitoring the door state (step 554) and monitoring for a change in gross weight of the cabinet 12 (step 556).

With continuing reference to FIG. 16C, if the system determines that the door is open at step 558, then the system proceeds to step 566. Step 566 may determine whether a Δ weight of stock is detected. The term "stock" may refer to the items disposed within the refrigerator 10. The Δ weight of stock may refer to the change in the gross weight of cabinet 12, which may indicate a change in the weight of the stock (step 566) or the presence of an external article (step 562). The change in the net stored weight of the stock in the cabinet 12 may be positive or negative. That is, an article may be added to the cabinet 12 to achieve a positive Δ weight. An article may be removed from the cabinet 12 to achieve a negative Δ weight. With continuing reference to FIG. 16C, if a Δ weight of stock is not detected at step 560 or step 566, then the system resets and continues monitoring the gross weight (556) and door state (554) for cabinet 12. If a Δ weight of stock is detected at step 566, then the system determines if the Δ weight of stock is greater than Threshold 1. Threshold 1 may be a predetermined weight that is less than a beverage article (for example, a can). An exemplary value for Threshold 1 may be approximately 12 grams. If the Δ weight of stock is not greater than Threshold 1 at step 570, then step 572 generates a new measurement of Δ weight+ previous Δ weight. The system resumes monitoring as discussed above.

Figure 17A:
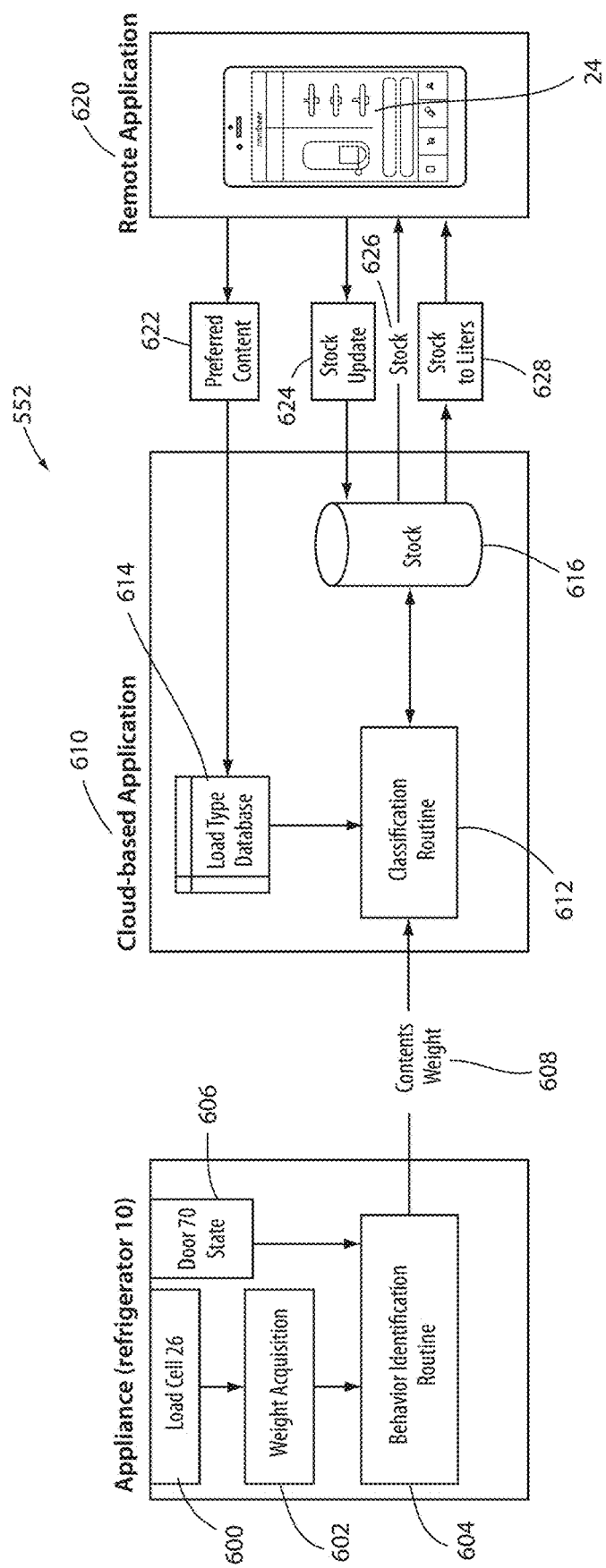
FIG. 17A is a block diagram of a system including an appliance, a cloud-based application, and a remote application.

Referring again to FIG. 16C, if the Δ weight of stock is greater than Threshold 1 at step 570, then the routine determines if the Δ weight of stock is greater than Threshold 2. In the example shown, Threshold 2 may be set as the weight of a 350 milliliters can 20a, which may be approximately 13.5 grams. See, FIGS. 16A, 16B. If the system determines at step 576 that the A weight of stock is not greater than Threshold 2, then the system generates a ranked list of the cabinet 12 stock, including the addition or removal of one can (for example, can 20a) from the cabinet 12 stock. If the system determines that the Δ weight of stock is greater than Threshold 2 at step 576, then the system proceeds to step 582. If the system determines that the Δ weight of stock is greater than Threshold 2 at step 576, then the article added to or removed from the cabinet 12 may be a beverage having a weight greater than that of the can 20a (i.e., approximately 13.5 grams). At step 582 the system determines the possible article added or removed. Based on the weight of the article added or removed, the routine may search its memory to identify the added or removed article as one of several known articles (for example, can 22b of 475 milliliters and 18.32 grams, can 22c of 600 milliliters and 360 grams, can 22d of 355 milliliters and 240 grams, and can 22e of 1000 milliliters and 700 grams, as shown in FIGS. 16A and 16B). At step 584, the system ranks the possible articles determined by step 582 from most likely to least likely. The system may rank the articles by comparing the weight of the added or removed article with the weight of known articles to determine which known article has the weight closest to the added or removed article. The ranking process may also utilize the preferred content 622 of the user. With reference to FIG. 17A and as will be discussed later herein, a user may provide a preferred content 22 to a classification routine 612. In step 586 the system adds the first ranked article to stock or the system removes the first ranked article from stock. In step 588 the system updates the list of stock. In step 590 the system generates an estimated content of the stock. At connector 592, the system continues cycling to monitor the door state (step 554) and to monitor the gross weight (step 556). As such, an inventory control system 552 for a refrigerator 10 may utilize changes in weight of articles added to or removed from a cabinet 12 stock to track the inventory of articles in the cabinet 12. Also, the inventory control system 552 may detect weight changes on the exterior of a cabinet 12.

FIG. 17A shows a block diagram of an exemplary inventory control system 552 for executing the process described above with reference to FIG. 16C in an appliance such as a refrigerator 10. The refrigerator 10 may include one or more load cells 26 as discussed above. A load cell 26 is identified in block 600. The load cell 26 may provide weight acquisition information 602 to the behavior identification routine 604. The door 70 state in block 606 may also be an input of the behavior identification routine 604. The behavior identification routine 604 may generate a contents weight output 608 that may be transferred to a cloud-based application 610.

With continuing reference to FIG. 17A, the refrigerator 10 may be in communication with the cloud-based application 610. The cloud-based application 610 may include a classification routine 612 (also referred to as a characterization routine) that may receive contents weight input 608 and an input from a Load Type Database 614. The classification routine 612 may deliver outputs to and receive inputs from a memory location designated "stock" 616.

The cloud-based application 610 may be in communication with a remote application 620. The remote application 620 may provide information about the refrigerator 10 inventory to a user. In one example, the remote application 620 may be displayed on a smartphone or other handheld device including a HMI 24. The remote application 620 may provide a user's preferred content 622 information to the Load Type Database 614 in the cloud-based application 610. The remote application 620 may provide stock update 624 information to the memory location designated "stock" 616 in the cloud-based application 610. The memory location designated "stock" 616 may output information designated "stock" 626 to the remote application 620. The information designated "stock" 626 may list the types of beverage articles in the refrigerator 10. The stock 616 may output information designated stock in liters by appropriate calculations to the remote application 620. The process step designated "stock to liters" 628 may determine and provide the volume of beverages in the refrigerator 10. As such, the exemplary inventory control system 552 for an appliance shown in FIG. 17A may assist a user in monitoring a changing refrigerator inventory. The user may access information about an estimated number of items (for example, cans 20a, 20b and bottles 20c, 20d, 20e in FIGS. 16A, 16B) in the refrigerator 10 and an estimated volume of beverages in the refrigerator 10 from the cloud-based application 610. The user may provide information about preferred content 622 or stock updates 624 to the cloud-based application 610.

Figure 17B:
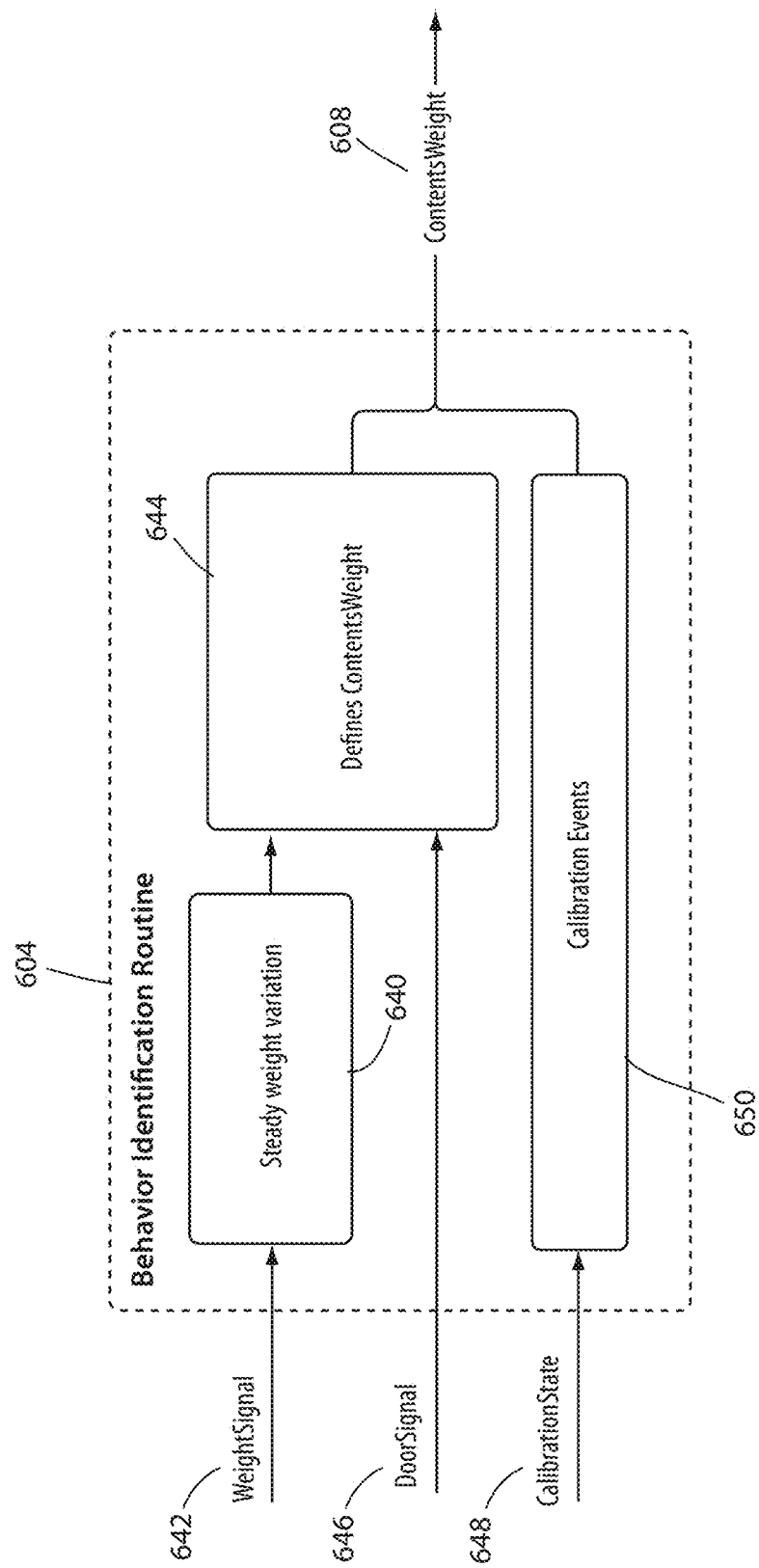
FIG. 17B is a logic diagram of a behavior identification routine identified in FIG. 17A.

Steps in an example of the behavior identification routine 604 are shown in FIG. 17B. The behavior identification routine 604 may include a steady weight variation block 640 that receives a weight signal 642 indicative of the weight acquisition 602 in FIG. 17A. The steady weight variation block 640 may provide an output to define contents weight block 644. A door signal 646 indicative of the refrigerator door state 606 in FIG. 17A may be input to the defines contents weight block 644. A calibration state 648 may be an input into the calibration events block 650. The defines contents weight block 644 and the calibration events block 650 may provide a combined output of Contents Weight 608 to the classification routine 612 in the cloud-based application 610 (FIG. 17A).

Referring now to FIGS. 17C-17G, aspects of the classification routine 612 are shown. Beginning with FIG. 17C, the classification routine 612 begins 670 by receiving Contents Weight 608 from the behavior identification routine 604. At step 672, a weight change calculation identified as "Delta Calculation" may be performed. The Previous Contents Weight may be subtracted from the Contents Weight 608 to obtain the Contents Weight Delta. At step 676, if the Contents Weight Delta is zero, then the classification routine 612 ends 678. At step 676, if the Contents Weight Delta is not zero, then a signal is sent to a store information step 680 that updates the Previous Contents Weight as the current Contents Weight. In step 682, it is determined if the Contents Weight is zero. If the Contents Weight is zero at step 682, then the stored information is reset 684. The Reset Stored Information step 684 includes setting the Previous Contents Weight to zero and the Previous Contents Weight Delta to zero. At step 684, the Previous Estimated Content is also reset. After the Reset Stored Information step 684, the Reset Stock step 686 takes place. The Reset Stock step 686 gives an input to the Stock 616. After the Reset Stock step 686, the routine 612 ends. Thus, weight change that is negligible with respect to determination of the stock within refrigerator 10 is recorded without a change in the stock information.

Figure 17C:
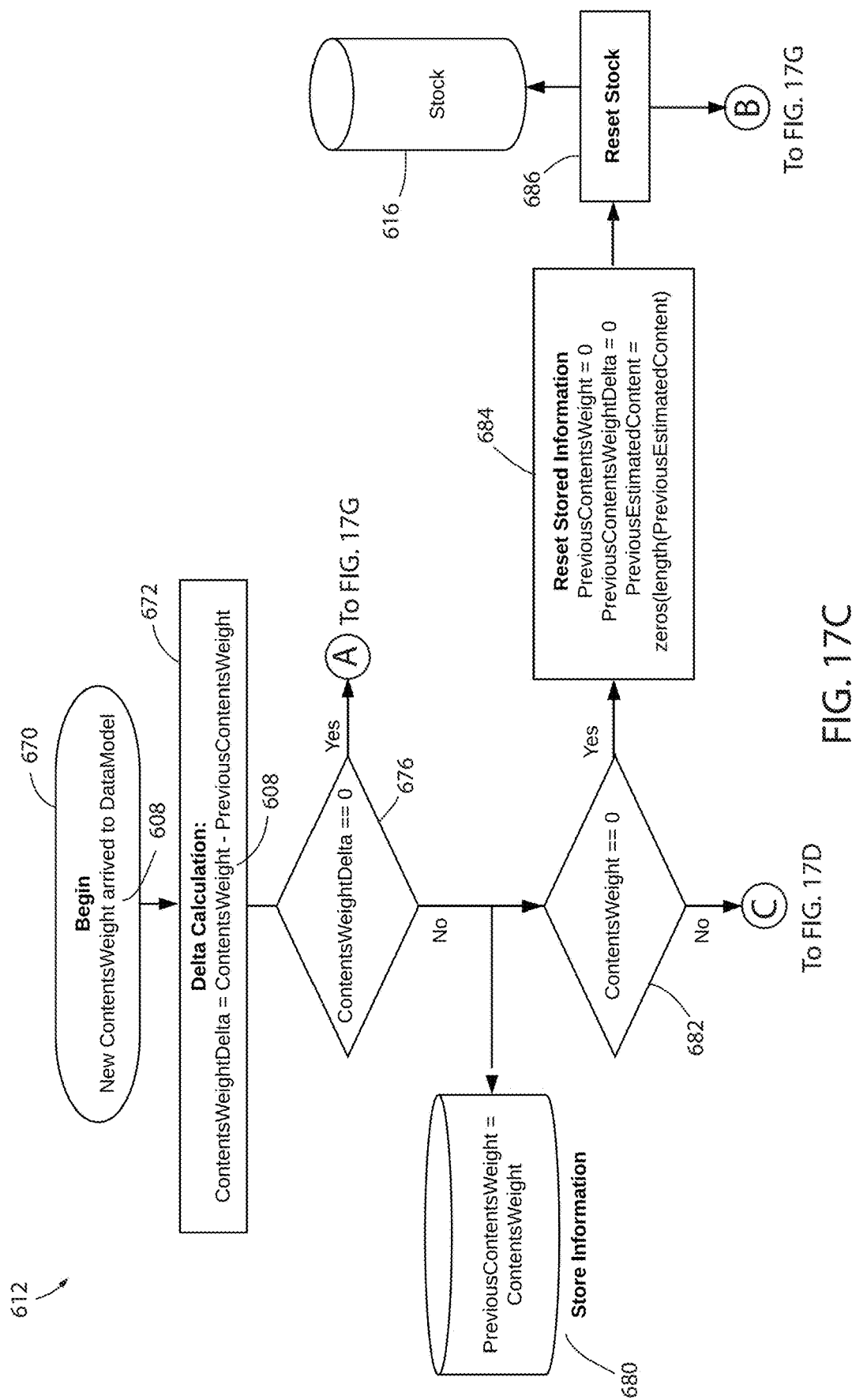
FIG. 17C is a first part of a logic diagram of a classification routine identified in FIG. 17A.
Figure 17D:
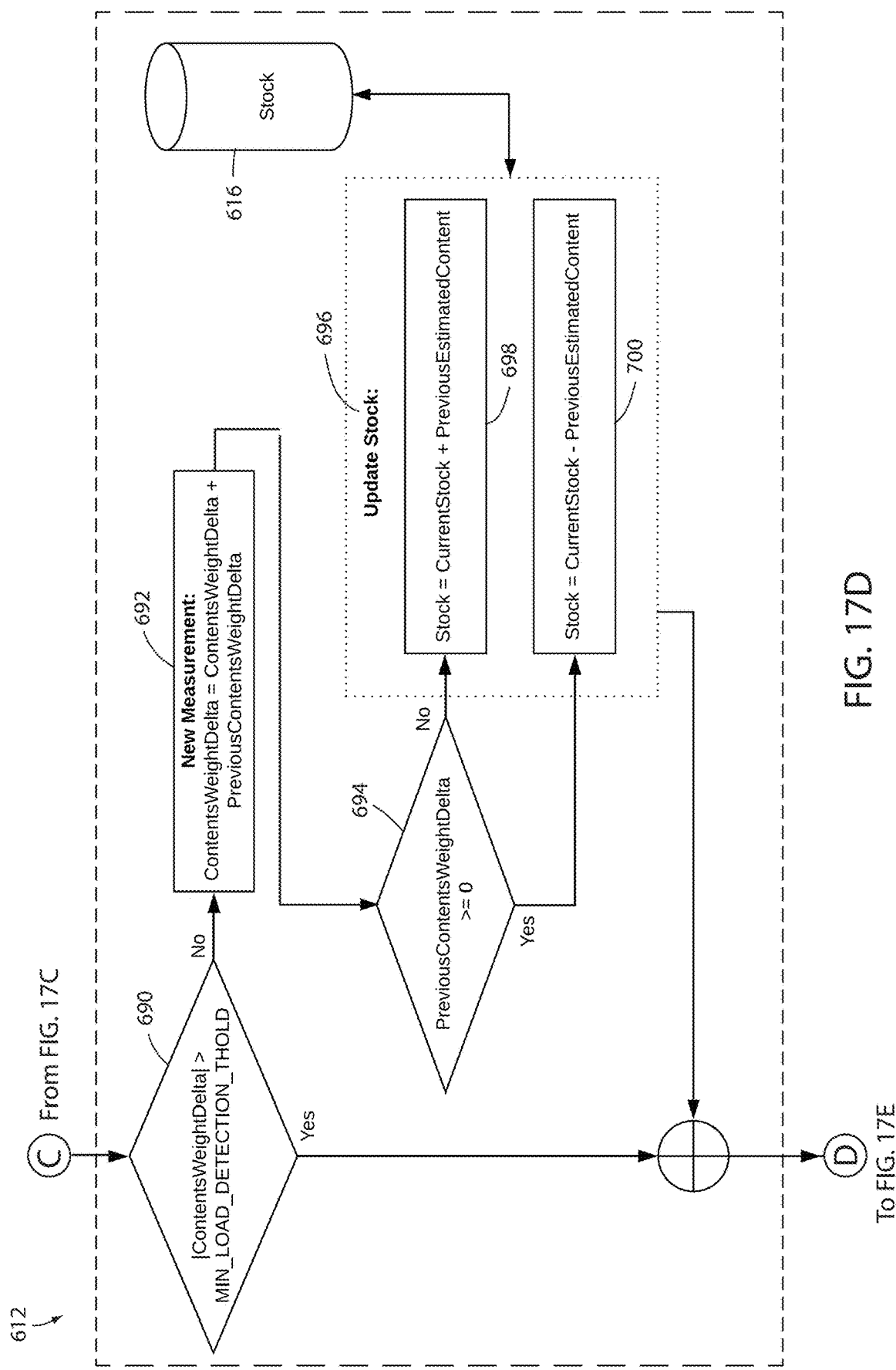
FIG. 17D is a second part of a logic diagram of a classification routine identified in FIG. 17A.

If the Contents Weight is not equal to zero at step 682 of FIG. 17C, then the routine determines if the Contents Weight Delta is greater than a minimum load detection threshold (for example, Threshold 1 at step 570 in FIG. 16C), as indicated in FIG. 17D. It should be appreciated that step 690 includes an absolute value of the Contents Weight Delta. Continuing with respect to FIG. 17D, if the Contents Weight Delta is not greater than a minimum load detection threshold, then step 692 provides a New Measurement of Contents Weight Delta equal to the sum of a Contents Weight Delta and a Previous Contents Weight Delta. In step 694, the routine determines whether a Previous Contents Weight Delta is greater than or equal to zero and executes the Update Stock step 696 accordingly. If at step 694 the Previous Contents Weight Delta is not greater than or equal to zero, then the Stock is updated to include the Current Stock in addition to the Previous Estimated Content (step 698). If the Previous Contents Weight Delta is greater than or equal to zero, then the Stock is updated to include the Current Stock minus the Previous Estimated Content in step 700. Information from the memory location designated "stock" 616 may be transferred to the Update Stock step 696. The result obtained in the Update Stock step 696 may be transferred to the memory location designated "stock" 616. In this manner, if the Contents Weight Delta is smaller than a minimum detection threshold, then the Contents Weight Delta may be aggregated into the last measurement and reclassified. After the Update Stock step 696 in FIG. 17D, the classification routine 612 proceeds to step 710 in FIG. 17E, where the weight change due to the addition or removal of an item that weighs less than the minimum load threshold from the refrigerator 10 stock is incorporated in the stock weight.

Figure 17E:
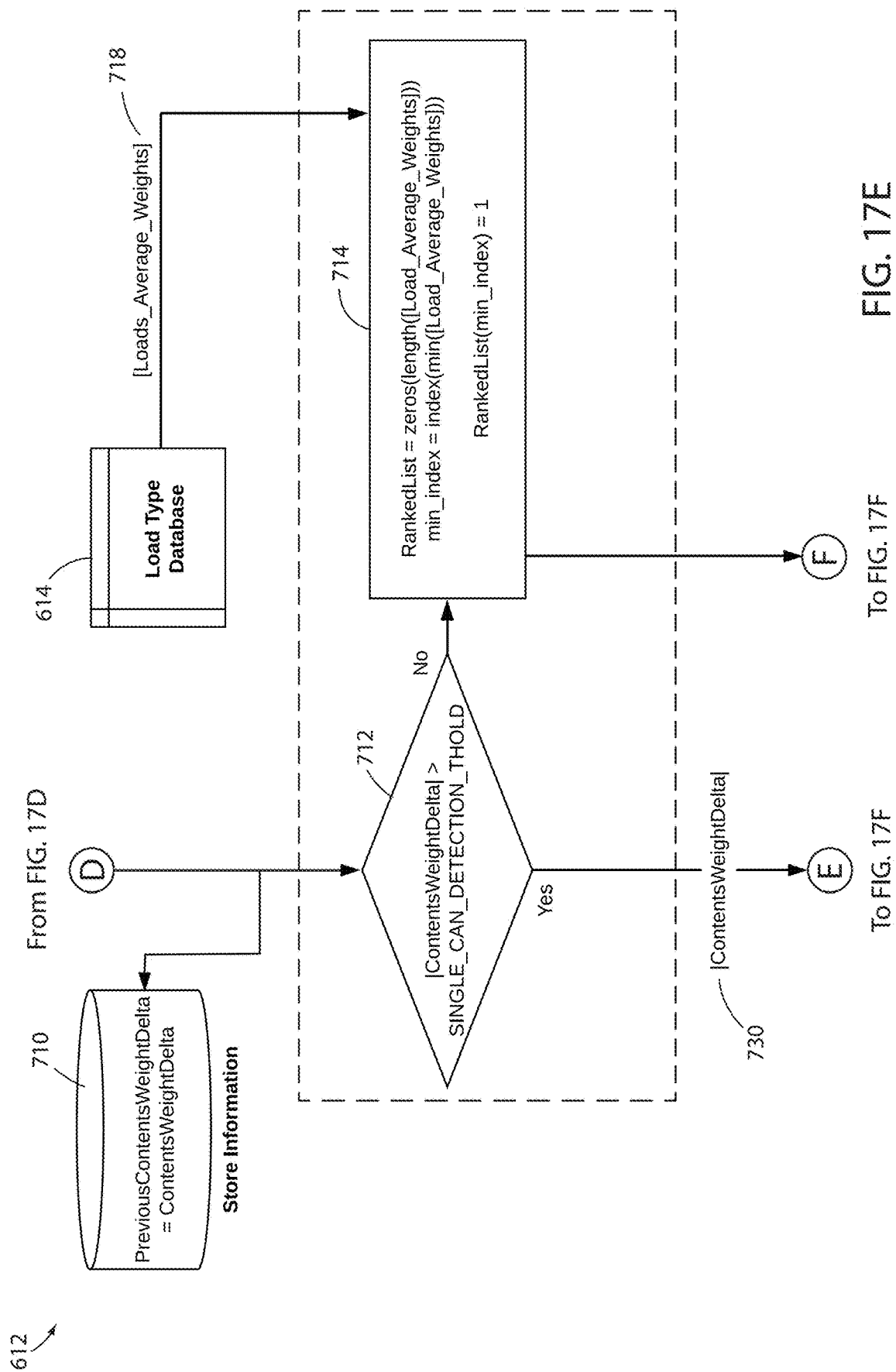
FIG. 17E is a third part of a logic diagram of a classification routine identified in FIG. 17A.
Figure 17F:
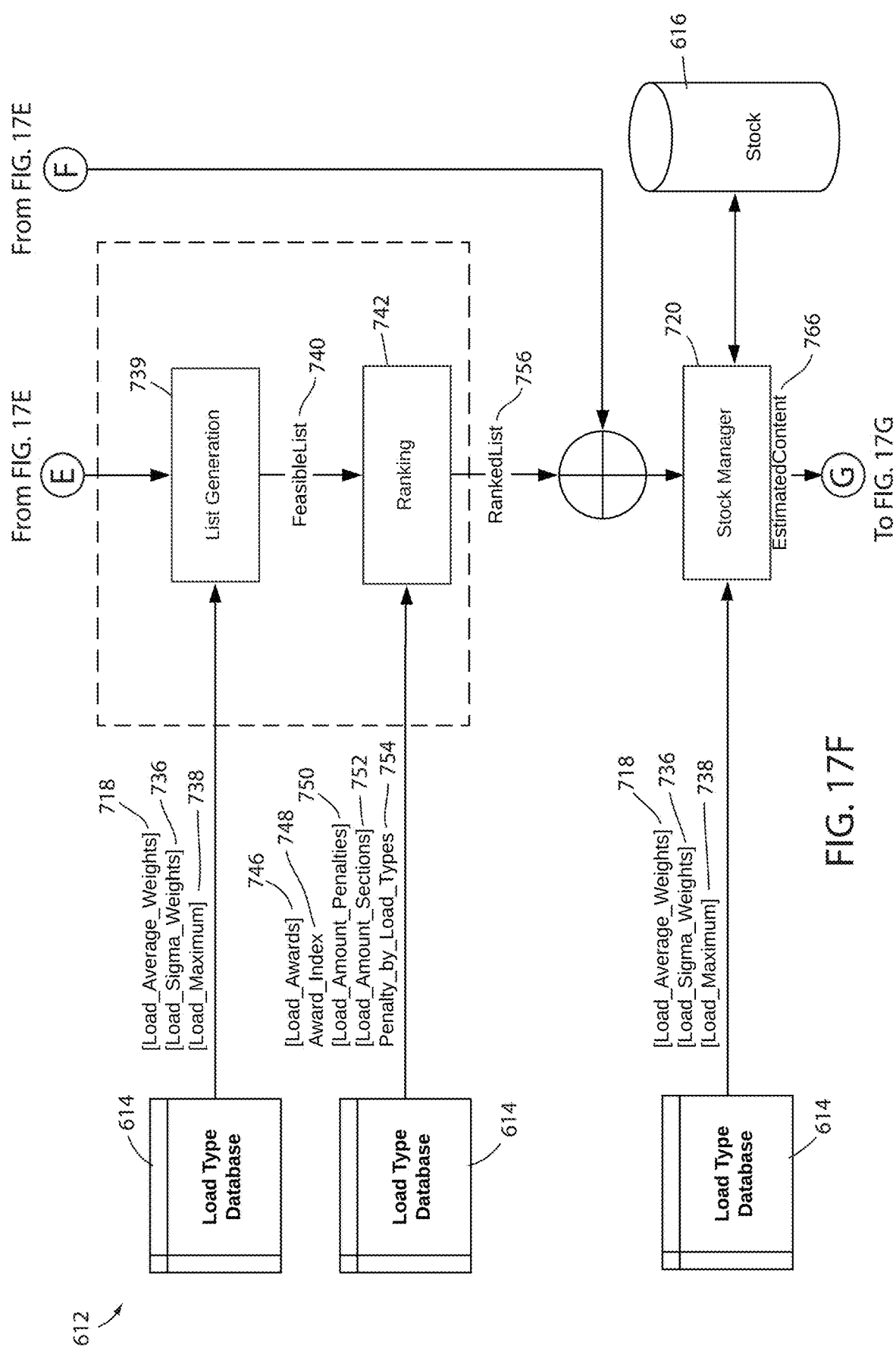
FIG. 17F is a fourth part of a logic diagram of a classification routine identified in FIG. 17A.

At step 712, if the Contents Weight Delta is greater than a Single Can Detection Threshold (i.e., Threshold 2 at step 576 in FIG. 16C), then the Contents Weight Delta is used for the List Generation step 739 at FIG. 17F. In particular, if the Contents Weight Delta is not greater than the Single Can Detection Threshold (Threshold 2 at step 526 in FIG. 16C), then the Ranked List and Minimum Index functions are executed at step 714, where an input 718 related to the average weights of various contained beverages from the Load Type Database 614 is received. The Ranked List and Minimum Index functions of step 714 may provide input to the Stock Manager at step 720 of FIG. 17F, such that, if delta is equal to or smaller than a single can detection threshold, the ranked list is set as a single option with one recipient of the lighter load type from the database of contained beverage types, with the particular recipient selected according to a routine described below.

Figure 17G:
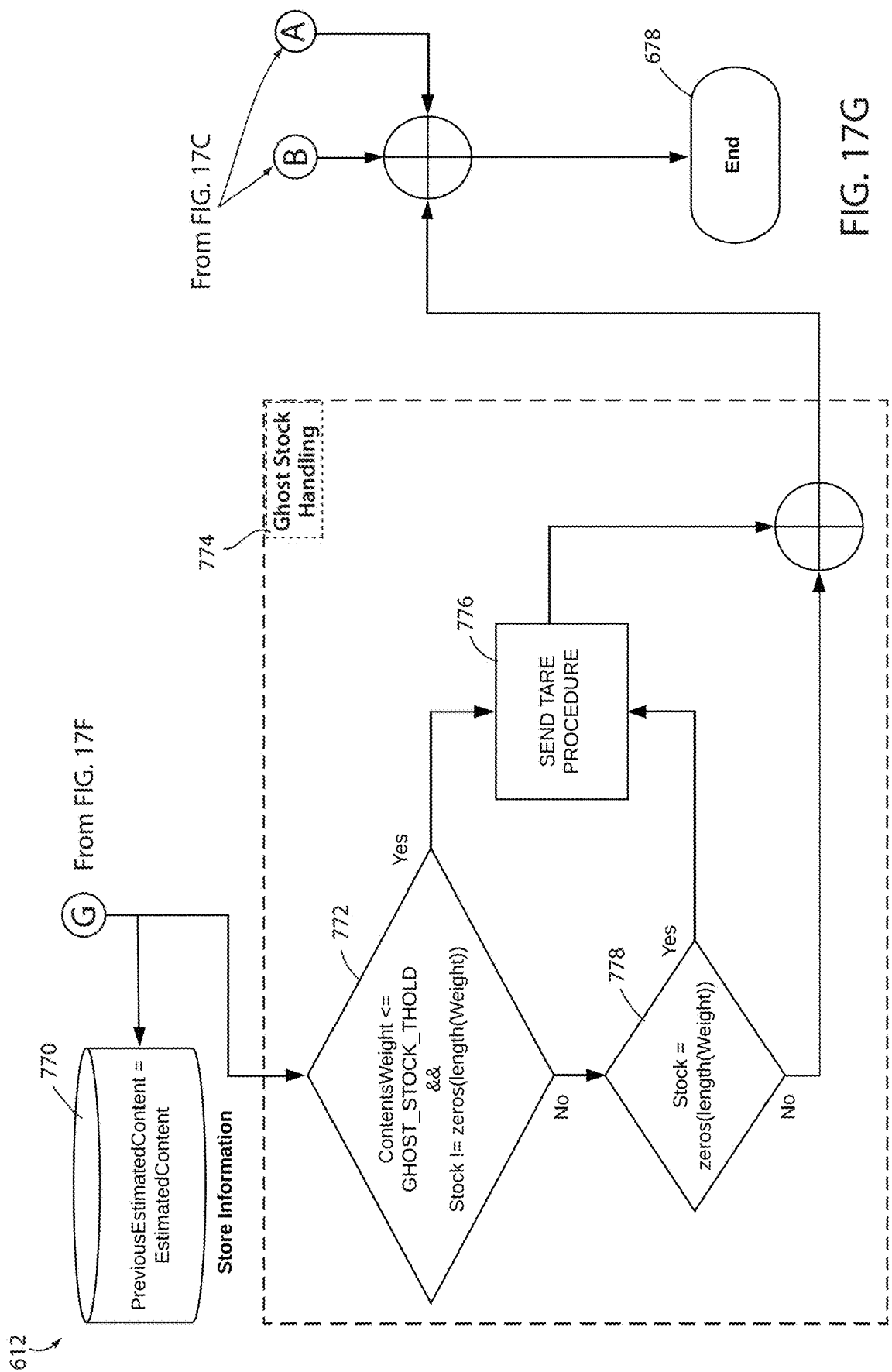
FIG. 17G is a fifth part of a logic diagram of a classification routine identified in FIG. 17A.

Referring now to FIG. 17F, the Contents Weight Delta 730 output of FIG. 17E may be an input for the List Generation step 739 where the routine 612 identifies an article that weighs more than a can. The List Generation step 739 may receive additional input from the Load Type Database 614. The Load Type Database 614 may include information about Load Average Weights 718, Load Sigma Weights 736, and Load Maximum 738. The Load Average Weights 718 may include average weights of beverage articles previously disposed in the refrigerator 10 and the corresponding article identifications. The Load Sigma Weights 736 may include the sum weight of several beverage articles deposited in the refrigerator together, for example a 4-pack of cans 20a where each can weighs 13.5 grams. The Load Maximum 738 may include maximum weights of particular beverage articles previously disposed in the refrigerator and the corresponding beverage identifications. The List Generation step 739 may generate a Feasible List 740 of potential contained beverages and/or package sets of multiple contained beverage based on the Contents Weight A. The Feasible List 740 may be an input to the Ranking step 742. The Ranking Step 742 receives information from the Load Type Database 614. The Load Type Database 614 forwards pre-stored information in the form of ranking Load Awards 746, an Award Index 748, Load Amount Penalties 750, Load Amount Sections 752, and Penalty by Load Type 754 to the Ranking step 742, which is aggregated and used to generate Ranked List 756 by the Ranking step 742. With continuing reference to FIG. 17F, the Ranked List 756 may be transferred to the Stock Manger 720 to output Estimated Content 766. The stock manager 720 uses the information from Load Type Database 614 about the Load Average Weights 718, the Load Sigma Weights 736, and the Load Maximum 738 of the highest ranked Load Type, which may be added to the Estimated Content output 766. With reference to FIG. 17G, the Estimated Content 766 is an input to the Store Information step 770. The Store Information step 770 provides that the Previous Estimated Content is equal to the Estimated Content.

Continuing with respect to FIG. 17G, the routine 612 also executes a Ghost Stock Handling 774 process. The Ghost Stock Handling 774 process identifies changes in stock weight due to thermal properties of beverage packaging and other miscellaneous thermal changes that may affect stock weight. At step 772, it is determined whether the Contents Weight is less than or equal to a predetermined Ghost Stock Threshold and if the Stock is equal to zero (length (weight)). If the Contents Weight is less than or equal to a predetermined Ghost Stock Threshold and if the stock is equal to zero (length(weight)), then the next step is to "send" a tare procedure 776. The "send" tare procedure 776 may remove weight changes due to miscellaneous thermal changes from the stock weight. If the Contents Weight is greater than the predetermined Ghost Stock Thresholds and if the stock is equal to zero (length(weight)) at step 772, then the next step is to set the stock equal to zero (length (weight)) at step 778. If the stock is equal to zero (length (weight)) at step 778, then the next step is "send" tare procedure 776. After the "send" tare procedure 776, the next step 678 is the End. If the stock is not equal to zero (length (weight)) at step 778, then the routine ends 678.

As such, aspects of the various embodiments of an inventory control system 522 for a refrigerator 10, 110, 210, 310, 410, and 510 discussed above may be represented by the steps shown in FIGS. 16C, 17A-17G.

As can be appreciated, refrigerator 10 can use the weight signal(s) from sensor 26 to determine the quantity of articles 20 stored within interior 16 using the various schemes and/or routines described with respect to FIGS. 17C-17G. In this respect, refrigerator 10 can be configured to determine the quantity of packaged beverages stored therein. In various additional aspects, refrigerator 10 can execute the process and routines to determine a net fluid weight of all beverages stored therein, excluding the weight of the individual packages containing beverages. In particular, such a refrigerator 10 has applicability in storing bottled or canned beverages, such as beer or the like, and can be intended (by storage configuration, instructions, marketing, or the like) for storage of such bottled or canned beverages exclusively.

To accomplish such quantification and to provide such a net beverages weight, the process and routines allow refrigerator 10 to subtract the empty cabinet 12 weight and the weight of articles that are external to the cabinet 12 from the gross weight of cabinet 12 measurement, as received from sensors and/or strain gauges and determined by way of the microprocessor or the like. See, for example, Behavior Identification Routine 604 at FIG. 17B. In some respects, such functionality is analogous to a typical tare system employed by scales or the like to re-zero to remove a container weight before measuring goods, such as ingredients or the like. In this manner, the weight of the empty cabinet 12 can be stored in memory and removed from the gross weight of cabinet 12 determination. In an additional or alternative process, the refrigerator 10 can set itself to zero upon being plugged in (and assumed empty). In a further example, refrigerator 10 can include a human-machine interface 24 on the exterior 14 thereof that can (by way of a display, button(s), etc.) seek confirmation that the interior 12 is, in fact, empty before re-zeroing. See, for example, Remote Application 620 in inventory control system 552, FIG. 17A. Similarly, refrigerator 10 maybe configured (i.e. by inclusion of Wi-Fi components and functionality with microprocessor or by integration therewith) to connect with a cloud-based application on a smartphone. See, for example, inventory control system 552 in FIG. 17A. In this manner, the application can guide a user through a setup process that involves re-zeroing prior to use of refrigerator for storage. In this manner, the measurements subsequently received and determined by refrigerator 10 regarding weight can correspond with a net article weight. In certain aspects it may not provide sufficient information by simply obtaining the net article weight measurement, as the containers storing the various beverages may vary, in both the amount of beverage stored therein, as well as the weight of the container itself.

Accordingly, as discussed above, it may be desired to communicate to the user just the volume of liquid beverage contained within refrigerator 10, which may vary over time as individual beverages are added and removed over time. In this manner, the electronic circuitry (e.g. microprocessor) executes steps 558-592 of process diagram FIG. 16C to estimate or otherwise derive and track a net packaging weight of the total articles stored in refrigerator 10 and to remove that weight from the net article weight to arrive at a net beverage weight, as well as a quantity of beverages being stored in refrigerator 10. To determine container weights and article quantities, the Load Type Database 614 can include various product weights that correspond to known weights of various, generally standard, packaged beverages. For example, as shown in FIG. 16, such packaged beverage types can include 12 oz. cans 20a, 16 oz. (i.e., pint or "tall boy") cans 20b, 12 oz. bottles 20d, 22 oz. bottles 20c, and 40 oz. bottles 20d (or their general metric equivalents) such that the filled weights (container and beverage) of such packaged beverage types are stored in memory. In various examples, such weights can be in generally-acceptable ranges, or the List Generation 739 and Ranking 742 steps used to compare the detected weight from sensors 26 and associated electronic circuitry can operate using built-in tolerances, to encompass variations in packaging weights that may exist (e.g. by varying material thickness or configuration of the container). In further examples, weights corresponding with combinations of such packaging can also be included in Load Type Database 614 so that, for example, a six-pack of 12 oz. cans 20d or bottles or a four-pack of 16 oz. cans 20a can also be identified.

Refrigerator 10 thusly configured can then detect changes in net article weight and compare the value of such a change to the stored information and, where applicable, identify the type of the packaged beverage that has been placed into interior 16 by the detected weight change being within the range of associated product type weight (or within the system tolerance of a single stored value). For example, if a change in net article weight is approximately 600 g, refrigerator 10 can infer that a single 12 oz. (355 ml) bottle 20d has been added to interior 16 by the resulting Contents Weight Delta in a list being generated 739 with such an article being ranked highest 742. See, for example, steps 576-592 in the inventory control system 552 of FIG. 16C and steps 712-766 of the classification routine 612 in FIGS. 17E-17F. Refrigerator 10 (by way of the included electronic circuitry) can then subtract the stored packaging weight for a 12 oz. bottle 20d (e.g., about 240 g) from the net article weight, the effect being an increase to the net stored beverage weight of about 355 g (i.e. about 12 oz.). Refrigerator 10 can also add one 12 oz. bottle 20d to an inventory maintained in memory 612. In another similar scheme, refrigerator 10 can multiply the stored quantity of articles by known product type by the varying known stored beverage amounts to arrive at a calculated net stored beverage weight. Refrigerator 10 can also be configured to perform oppositely when a decrease in weight is detected. For example, if a decrease in net stored article weight of about 390 g is detected, refrigerator 10 can infer that a 12 oz. can 20a was removed from interior 16 and can decrease the inventory accordingly and subtract about 350 g (or 12 oz.) from the net stored beverage weight. As previously discussed, the examples of the inventory control system 552 shown in the process diagram of FIG. 16C and the classification routine 612 (FIGS. 17C-17G) address increases and decreases in net stored article weight.

In a further aspect, the refrigerator 10 weight measurement system can be configured, as discussed above, to work in conjunction with an application. Such an application may be presented on HMI 24 or can be in the form of a smartphone application or the like, enabled by refrigerator 10 including the capability to connect with and communicate using the internet. See, for example, remote application 620 shown in FIG. 17A. In this manner, refrigerator 10 can be capable of asking the consumer to confirm the content added in case the independent weight measurement system (and decision making routine associated with it) is unable to determine a known package type with a desired degree of accuracy. See, for example, communication between cloud-based application 610 and remote application 620 shown in FIG. 17A. In one example, the weight of a four pack of 16 oz. cans 20b may have a similar weight to that of a 40 oz. bottle 20e of beer, but may contain a greater volume of liquid, meaning that knowing which has been added to interior 16 is desirable. Accordingly, if refrigerator 10 detects such an ambiguous weight change, it can ask the user for confirmation by presenting both possible options and asking the user to select the correct package type added before updating inventory and net stored beverage weight information. See, for example, communication between cloud-based application 610 and remote application 620 in FIG. 17A.

Figure 17H:
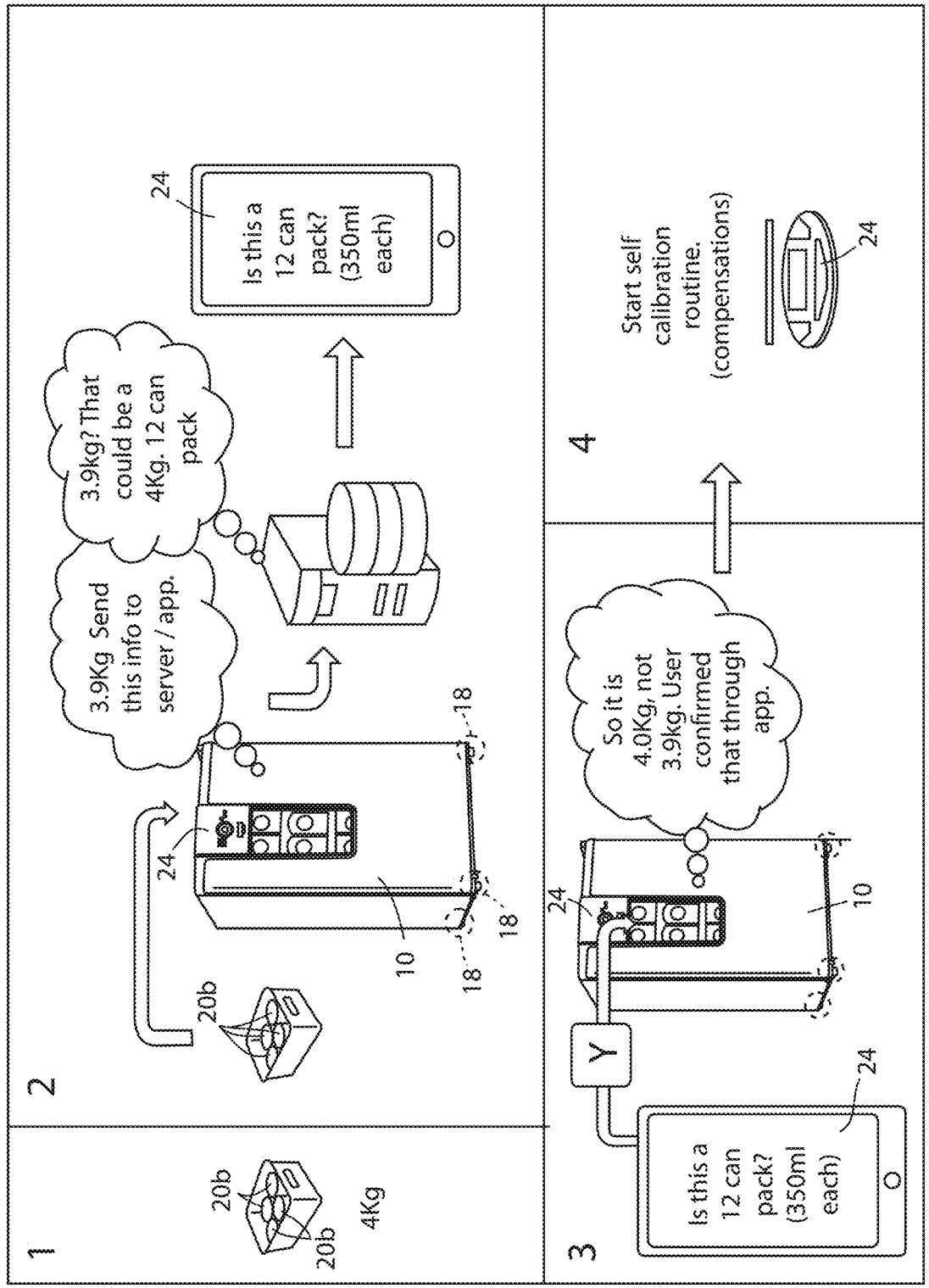
FIG. 17H is a flowchart depicting a sequence of steps in a method for determining a quantity and associated stored fluid weight of an article placed within a refrigerator according to an aspect of the disclosure.

In a variation of such a scheme, the electronic circuitry can be configured to detect an increase in the gross weight of the cabinet 12 and, prior to making any determination regarding packaging type or quantities, to prompt for entry of a product type by the user by way of the HMI 24. See, for example preferred content step 622 in inventory control system 552 of FIG. 17A. Such a selection can be made from a plurality of product types with associated respective known product weights stored in memory. When the user makes a selection, refrigerator 10 can then determine, for example, the quantity of beverages added by dividing the known product weight of the entered product type by the increase in gross weight to determine the quantity of beverages added. The refrigerator 10 can adjust inventory and net stored beverage weight information accordingly. In a further variation, the user can enter a preferred product type that acts as a default when a weight corresponding with a multiple of the known weight of such a product, such that refrigerator 10 may not prompt the user for a selection, but may rather simply allow the user to indicate a different product, as needed. In one example, the user can preselect a preference for bottles, which typically contain about 350 ml of beer (weighing approximately 350 g) at a total weight of about 560 g, the refrigerator 10, when detecting added weight in a multiple of 560 g, can look for confirmation that the appropriate number of bottled beers have been added and deduct the appropriate weight in the same multiple of the bottle weight (about 210 g). FIG. 17H illustrates a sequence of steps according to at least an embodiment of the above description.

Figure 14:
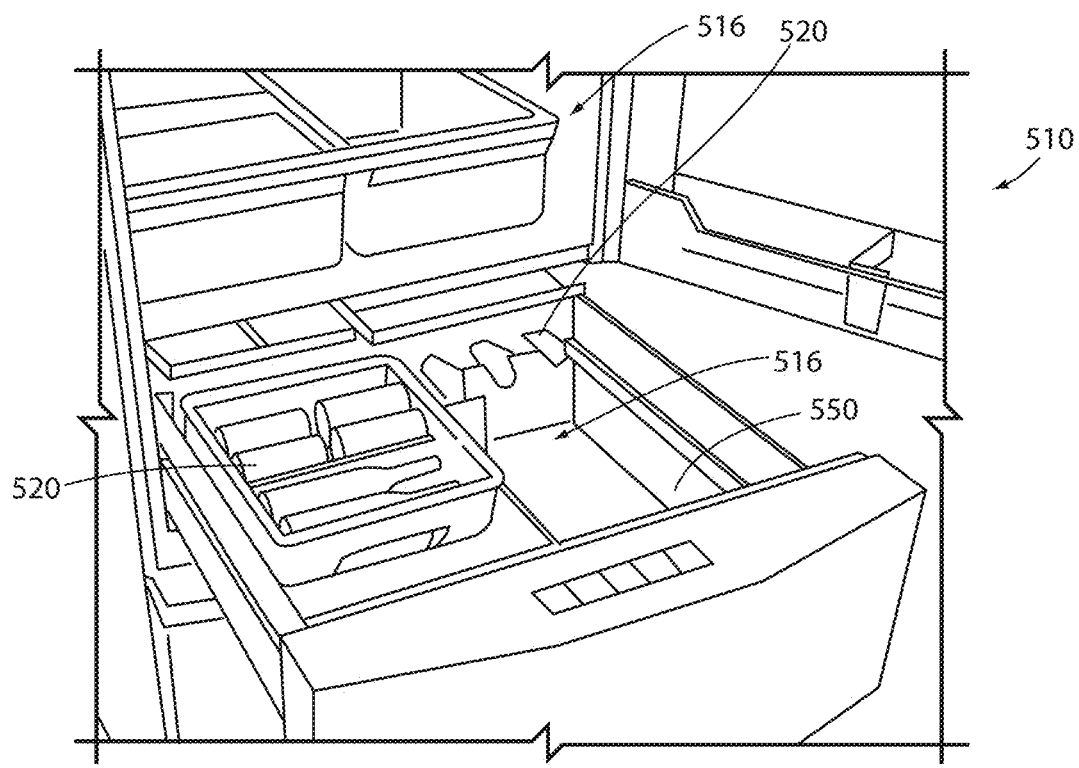
FIG. 14 is a perspective view of a refrigerator according to a still further aspect of the disclosure.
Figure 15:
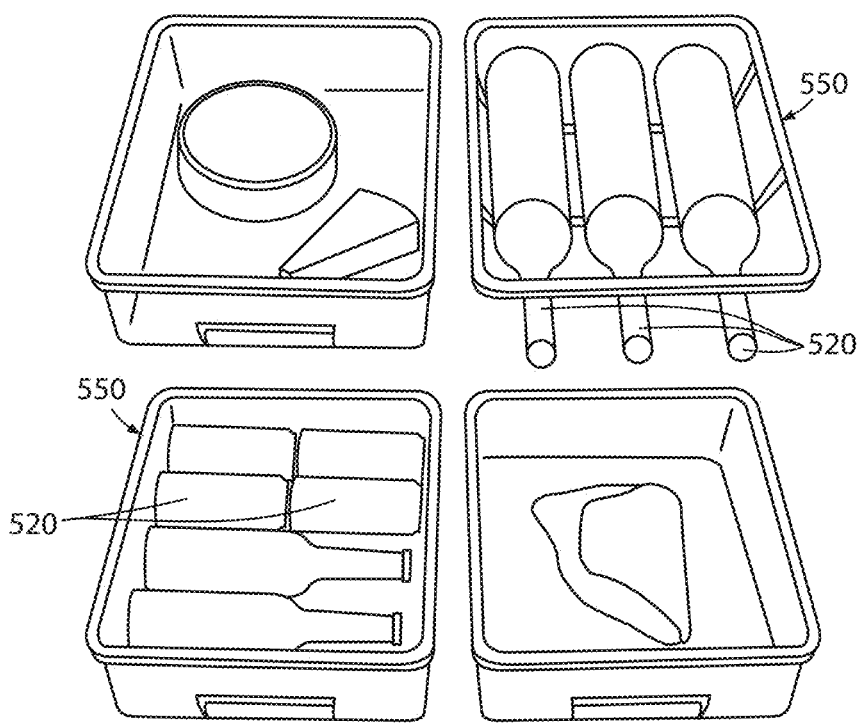
FIG. 15 is a perspective view of various storage compartments including articles for storage within the refrigerator of FIG. 14.

In additional or alternative arrangements, refrigerator 410 (FIG. 14) can include, in memory, weights corresponding to package types of wine bottles (e.g. 750 ml or the like) and can be configured to track the addition of wine bottles thereto and to store and display the stored weight (and/or volume) of wine therein. In such an embodiment, refrigerator 10 may be further adapted for wine storage, such as by including specifically-configured racks and by being configured to maintain internal conditions (e.g. temperature, humidity, etc.) for storing wine. In a still-further arrangement, a refrigerator 510 can be configured to provide for the storage of articles 520 (FIG. 15), such as in bins 550 in addition to packaged beverages, but may still be configured with weight sensing means, as discussed above, and onboard electronics programmed for identifying a weight increase corresponding to a packaged beverage type and to maintain an inventory and net beverage weight thereof, regardless of other products (with associated weights) being stored therein.

In a further alternative, refrigerator 10 can include specific monitoring means within and/or directed toward the interior 16. In one aspect, such monitoring means can include one or more cameras and corresponding programming of the above-described electronic circuitry to identify packaged beverages from an image from within interior 16 (including various edge detection routines or the like). In such an arrangement, quantity and package type information can be derived from the monitoring means and associated programming and can be used to remove packaging weight from a net stored article measurement. Other types of monitoring means can include an infrared camera, ultrasonic transducers, laser-imaging equipment, and the like.

Figure 18A:
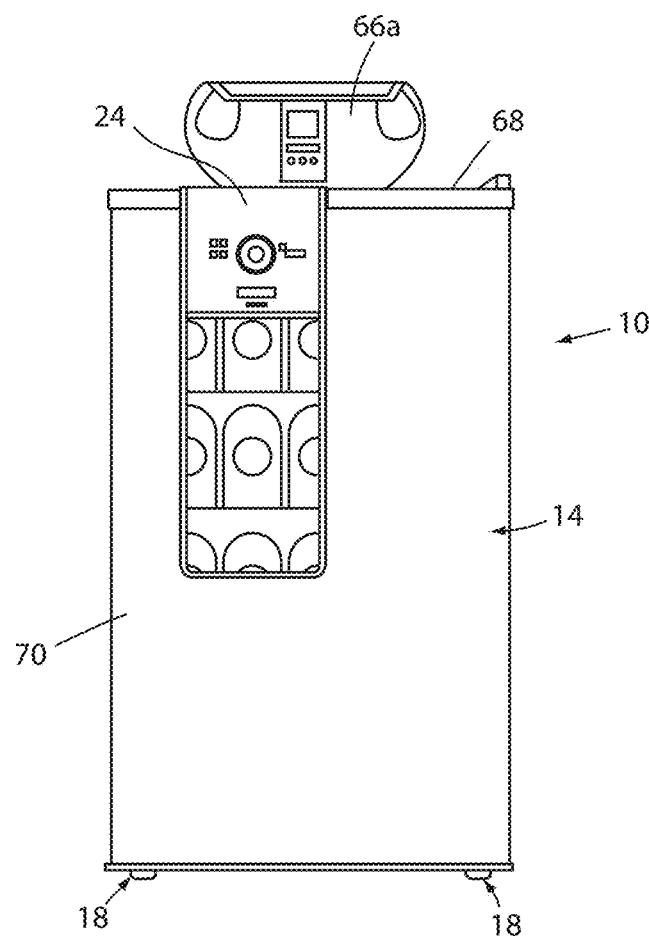
FIGS. 18A and 18B are front views of refrigerators including external objects placed thereon.
Figure 18B:
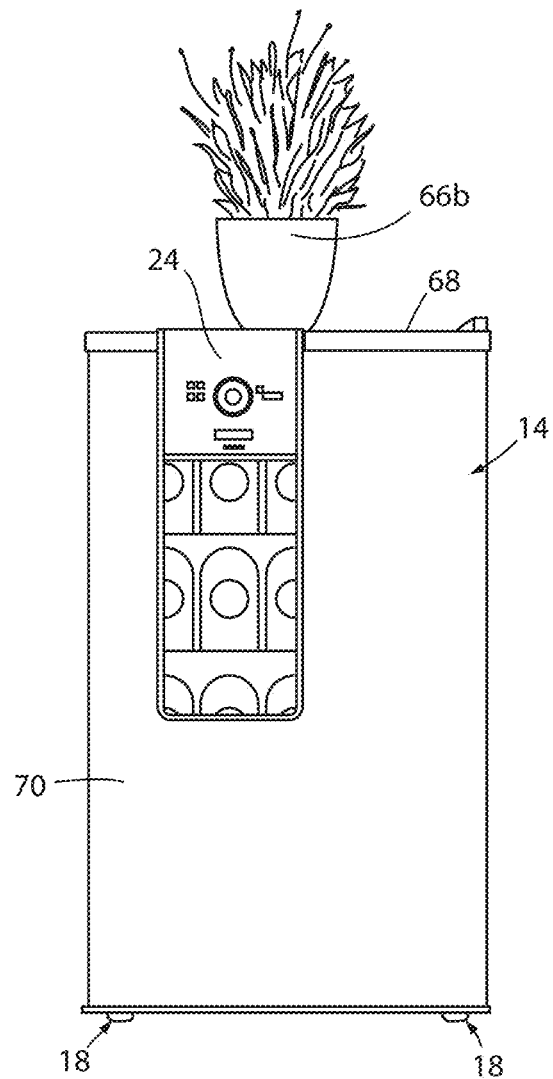

As shown in FIGS. 18A and 18B, and as previously explained, the electronic circuitry in refrigerator 10 can further be configured to determine a condition where the signal corresponding with the gross weight of the cabinet 12, including the plurality of articles 20 retained within the interior 16 of the cabinet 12 specifically including an external object 66 weight. Further, if such an object 66 is identified, the electronic circuitry can subtract the weight determined to be that of the external object 66 from the gross weight prior to determining the quantity of the plurality of articles and/or the net stored beverage weight, according to any of the process or schemes described above. As shown in FIGS. 18A and 18B, a user may position additional objects 66a,66b on the upper surface 68 of cabinet 12. The weight of such an object 66a,66b is also transferred to the sensors 26 associated with feet 32, meaning that additional weight can be added to the measurement taken by refrigerator 10 to be indicative of the gross weight of the cabinet 12 and articles 20 stored in interior 16. Because the weight of the cabinet 12, as subtracted from the gross weight to derive the net stored article weight, may be stored in memory as a fixed value (including after an initial calibration), the weight of any external objects 66a,66b may be included, unintentionally, within the net stored article weight and may render any quantification or net stored beverage weight determinations inaccurate or invalid.

Accordingly, as discussed above, the electronic circuitry in refrigerator 10 may be programmed to determine when an increase in the gross weight measurement is due to the presence of an external object 66a,66b. In one example, the electronic circuitry can be programmed or otherwise configured to discard or disregard any increases in the detected gross weight from sensor(s) 26 that are detected when door 70 of refrigerator 10 (door 70 being considered a portion of the cabinet 14 for purposes of the present disclosure) is closed by monitoring the door state in step 606 (FIG. 16C). In this manner, refrigerator 10 may include a door position switch, such as a mechanical switch positioned in interior 16 in a position to be engaged and depressed when door 70 is closed. Alternatively, the electronic circuitry may include a gyroscope or other electronic element configured for detecting movement of door 70. Such an element may be included within door 70 and electronically connected with the other electronic circuitry (e.g. microprocessor) or may be included therewith in a single module positioned within door 70 and including HMI 24, as generally depicted in the figures. In an alternative embodiment, the electronic circuitry may present an option for an external element when presenting other lists of possible items that are added to refrigerator 10 or may ask the user if an external object 66a,66b is present when detecting a weight increase that doesn't correspond with (such as by being indistinguishably between or above) the stored product type weights. If the user provides an answer in either case that indicates the presence of an external object, the electronic circuitry may discard the detected additional weight or may otherwise recalibrate to the last known net stored liquid weight value. In a further aspect, the electronic circuitry may additionally or alternatively measure and subtract small weight variations occurring over time (including when door is closed) as thermal variation, mechanical accommodation, or the like, such as discussed above in steps 772 to 778 in FIG. 17G.

Additionally, refrigerator 10 can include functionality to ensure that the added weight of any objects 66b on the top surface 68 of refrigerator 10 do not damage the sensors 26 associated with feet 32. In an embodiment, a warning can be given on HMI 24 visibly and/or audibly (such as by a speaker associated with HMI 24), if the total weight over a predetermined maximum is detected. In an example, the object 66a in FIG. 18A may be below such a threshold, but the object 66b in FIG. 18B may be over, resulting in such a warning. The warning can be given over a predetermined period of time and can be repeated at varying intervals, as the damage that may occur to the sensors 26 may take place gradually, over time. The refrigerator 10 can also keep a log of overload situations, which can be limited to a specific number of instances or a predetermined history interval (e.g. six months).

Figure 19A:
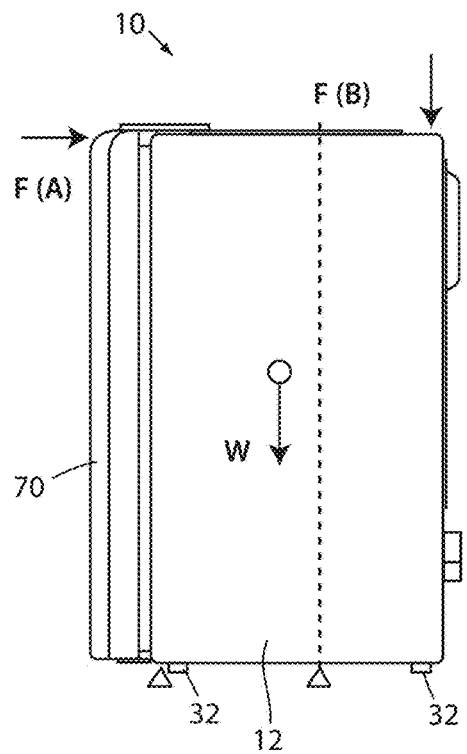
FIGS. 19A and 19B are side and top views depicting a change in the center of gravity of a refrigerator with a door thereof in respective closed and open positions.
Figure 19B:
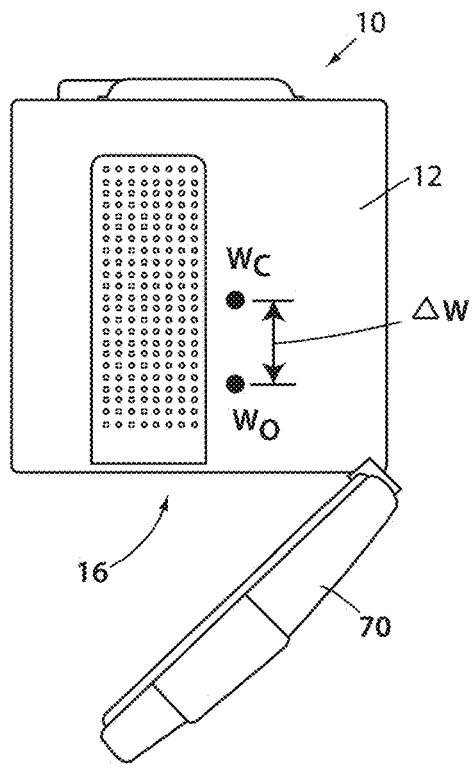
Figure 20:
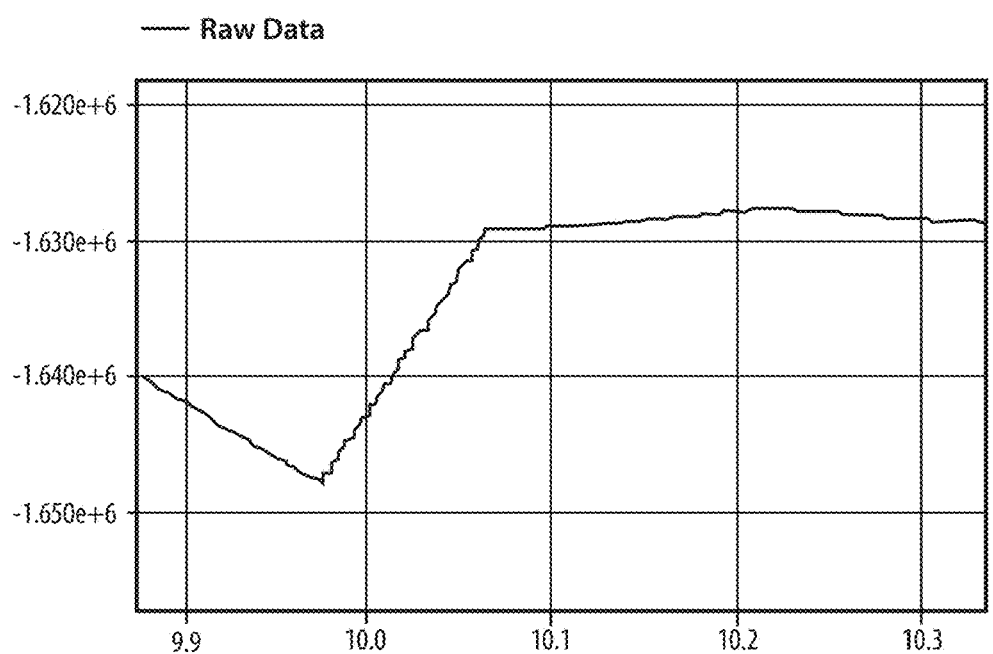
FIG. 20 is a graphic depiction of a signal from a load sensor during a door opening event of the refrigerator of FIGS. 19A and 19B.
Figure 21:
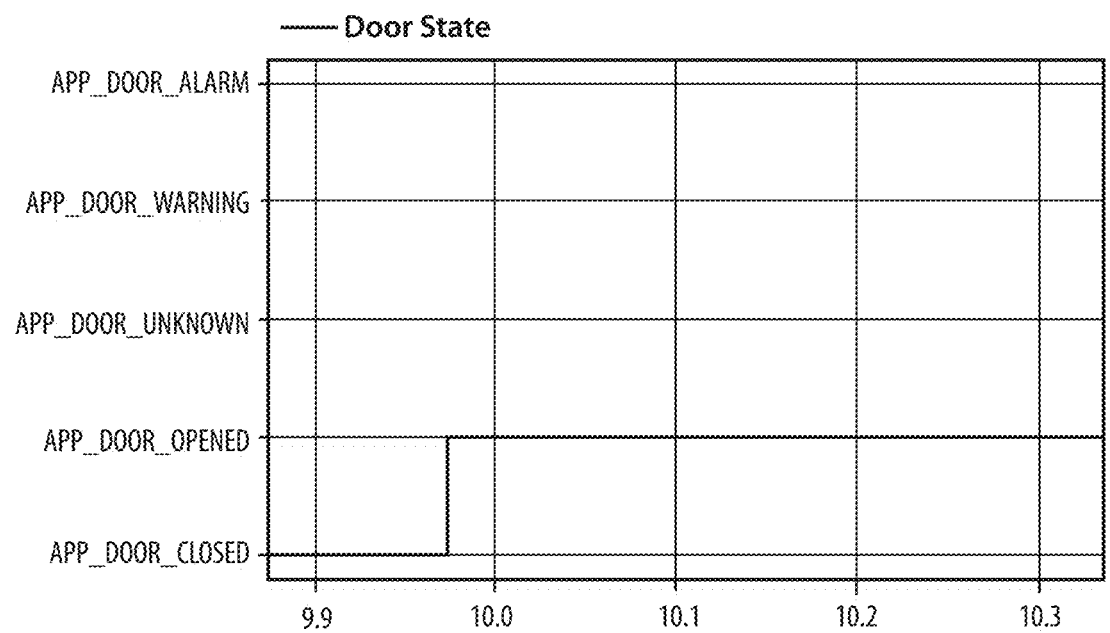
FIG. 21 is a graphic depiction of door state detection carried out by the refrigerator of FIGS. 19A and 19B using the sensor signal of FIG. 20.

In another embodiment, refrigerator 10 can utilize the sensor 26 signals to determine the condition of door 70. In this manner, the electronic circuitry can be programmed to identify changes in the signal from particular sensors 26, such as those disposed closest to door 70. Further, the electronic circuitry can compare the signal in such identified changes to profiles stored in memory indicating, for example, that door 70 is open. As shown in FIGS. 19A and 19B, this is possible because of the weight of door 70 (which may be up to one-third of the total weight of cabinet 12, for example) influences the total weight distribution of cabinet 12, and accordingly the center of gravity W, on feet 32 when open and closed. In particular, the weight of door 70 on the resulting moment arm, when door 70 is open, increases the amount of the weight of cabinet 10 over the front feet 32 (i.e. those closest to door 70) and correspondingly reduces the weight on the remaining (rear) feet. An example of the signal from sensors 26 associated with the front feet 32 is shown in FIG. 20. Given, that the weight and size of door 70 is known, the electronic circuitry can determine when a weight change on one or more feet 32 matches the change in weight distribution by door 70 being opened by a predetermined angle.

At such a point, the electronic circuitry can determine that door 70 is open and make a corresponding entry into memory or logic and/or can output a corresponding signal for receipt and use by other components within refrigerator. In this manner, such a door detection scheme can be used in connection with the various functions discussed herein that utilize door detection or door condition monitoring. During the door detection or door condition monitoring, a routine may detect door use patterns. Based on the door use patterns detected by the routine, the routine may activate features related to content detection (for example, compressor status, interior light status). Also, based on the door use patterns detected by the routine, the routine may suggest less aggressive interactions between the door and the refrigerator to a user through HMI 24 or other means.

Figure 22:
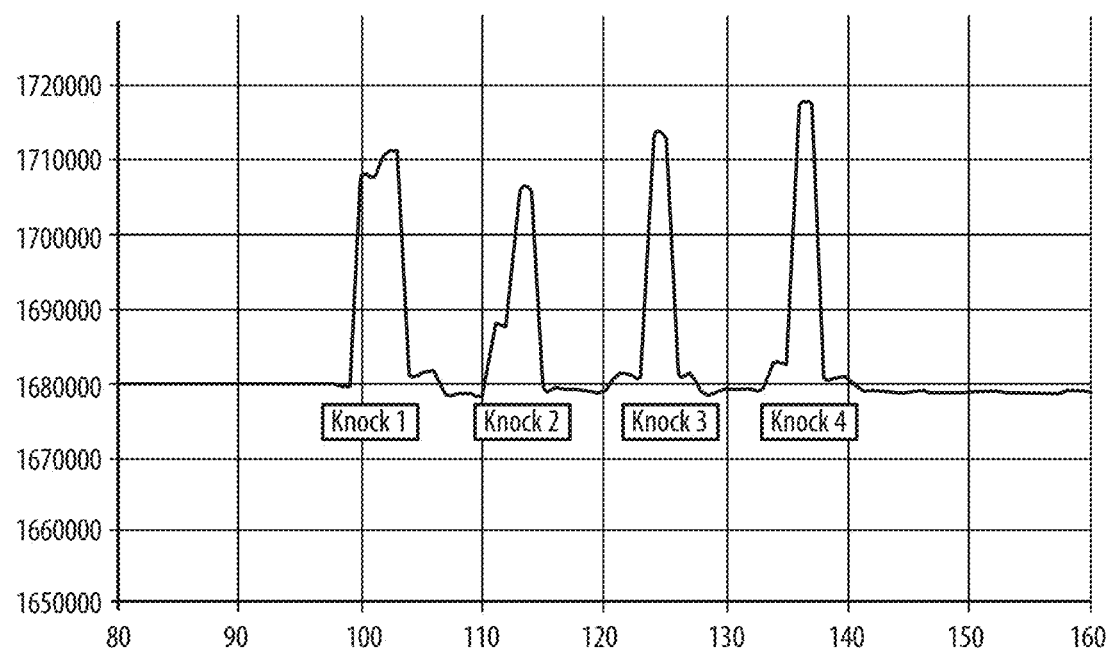
FIG. 22 is a graphic depiction of a signal from a load sensor during a series of knocks imparted on the refrigerator of FIGS. 19A and 19B.

Further, the electronic circuitry in refrigerator 10 can determine other conditions or events based on a similar detection scheme. In one example, the electronic circuitry can implement a bump detection scheme in which bumps, knocks, or patterns thereof can be detected, including a determination of a particular side or surface of cabinet 12 with which contact is made. Again, this can be done by comparing a signal from one or more sensors 26 with profiles stored in memory regarding sensor signal behavior during predetermined events, as shown in FIG. 22. In this manner, a user can bump or knock on door 70 (or another predetermined portion of cabinet 12) to turn on a light inside refrigerator 10, which may be useful in connection with a variation, as depicted in FIG. 1, where door 70 includes a window or other transparent portion. In a further example, the user can confirm or reject assumptions made regarding measurements and determinations (e.g., regarding a package type determination) by knocking on respective sides of cabinet 12. In one example, refrigerator 10, upon determining that an article 20 placed within cabinet 12 is a six pack of cans, can ask for confirmation of such determination by way of HMI 24 and prompt the user to knock on one side to confirm and the other to reject. Upon rejection, another possible article type can be presented.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

In various embodiments, the invention can be characterized in various clauses and various combinations thereof, including the following paragraphs:

A refrigerator wherein each of the plurality of feet includes a sleeve defining an upper surface contacting a load transducer and adjustably supporting a respective lower surface of a foot.

A refrigerator wherein the sleeve is slidably received in a supporting base coupled with the cabinet of the refrigerator.

A refrigerator wherein the sleeve is included in a supporting unit slidably coupled with the cabinet of the refrigerator.

A refrigerator wherein the cabinet includes an outer wrapper defining an exterior of the cabinet, the exterior including the bottom surface of the cabinet, the cabinet further including one or more mounting blocks receiving respective ones of the plurality of load transducers.

A refrigerator wherein the plurality feet are coupled with respective ones of the mounting blocks and are moveable in a direction normal to the bottom surface of the cabinet.

A refrigerator wherein the electronic circuitry is configured to determine the quantity of articles by increasing a quantity of articles when the gross weight of the cabinet increases by a predetermined amount, and by decreasing the quantity of articles when the gross weight of the cabinet decreases by the predetermined amount.

A refrigerator wherein the electronic circuitry is further configured to associate an article type with the quantity of articles added to the refrigerator or removed from the refrigerator by comparing the associated increase or decrease in the gross weight of the cabinet with a plurality of known product weights.

A refrigerator wherein the plurality of known product weights includes a default product weight selected by a classification routine from a plurality of product types with associated respective known product weights.

A refrigerator wherein the electronic circuitry is further configured to determine the quantity of articles by dividing the increase in the gross weight of the cabinet by a known product weight of the article type to determine an added quantity, and adding the quantity to a previously-determined stored quantity.

A refrigerator wherein the electronic circuitry is further configured to determine a net container weight by multiplying the at least one known product weight by the quantity of articles, and determine a net fluid weight by subtracting the net container weight from a net stored weight.

A refrigerator further comprising a monitoring device directed toward the interior of the cabinet and wherein the electronic circuitry is further configured to receive a signal from the monitoring device and to derive a quantity of the plurality of articles using the signal.

A refrigerator wherein the electronic circuitry is further configured to determine a net container weight by multiplying the at least one known product weight by the quantity of the plurality of articles, and determine a net fluid weight by subtracting the net container weight from the net stored weight.

A refrigerator wherein the electronic circuitry is further configured to determine a condition where the gross weight of the cabinet includes an external object weight, and subtract the external object weight from the gross weight of the cabinet prior to determining a quantity of the plurality of articles.

A refrigerator wherein the electronic circuitry is further configured to detect an overweight condition wherein the signal corresponding with the gross weight of the cabinet and the plurality of articles indicates an excess load condition for the plurality of load transducers, and output an indication of the overweight condition.

A refrigerator wherein the electronic circuitry is configured to detect a predetermined user interaction with the cabinet.

A refrigerator wherein the plurality of feet include a corresponding plurality of casters disposed on the lower surfaces of the plurality of feet.

An inventory control system for a refrigerator of the preceding clauses, further including a stock indicator, wherein the stock indicator is configured to display the output indicative of the current inventory in the refrigerator through a remote application.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A refrigerator, comprising:
    a cabinet defining an exterior configured for resting on a surface and an interior;
    a plurality of mounting blocks disposed in respective locations along a bottom surface of the cabinet and each affixed to the cabinet by at least a first bolt extending through a first hole in the mounting block;
    a plurality of feet coupled with the cabinet along the bottom surface thereof, each of the feet including a sleeve defining an upper surface, adjustably supporting a respective lower surface of the foot, and attached to the bottom surface of the cabinet by attachment with a respective one of the plurality of mounting blocks, each by at least a second bolt received in a second hole in the respective one of the plurality of mounting blocks, and configured to retain the sleeve with the mounting block such that the upper surface of the sleeve is in a fixed lateral and longitudinal position with respect to the bottom surface of the cabinet, while being slidably moveable toward and away from the bottom surface of the cabinet;
    a plurality of load transducers respectively received within a portion of each of the plurality of mounting blocks and disposed between the cabinet and respective ones of the upper surface of a respective one of the sleeves associated with each of the feet, the fixed lateral and longitudinal position attachment of the sleeve to the respective mounting block maintaining the upper surface of the sleeve in alignment with the respective one of the plurality of load transducers such that the slidably moveable attachment allows respective portions of the gross weight of the cabinet to be applied to each of the plurality of load transducers when the refrigerator is supported on a surface by the feet; and
    electronic circuitry including a non-transitory computer-readable medium configured to receive a signal corresponding with the gross weight of the cabinet from the plurality of load transducers and to determine the quantity of articles retained within the interior of the cabinet.

2. The refrigerator of claim 1, wherein each of the plurality of sleeves includes threading internal thereto to adjustably support the respective lower surface of the foot by receipt of an externally threaded stem associated with the lower surface.

3. The refrigerator of claim 2, wherein the sleeve is slidably received in a supporting base unit fixedly coupled with the cabinet of the refrigerator mounting block by the second bolt, a respective one of the load transducers being respectively received in the supporting base.

4. The refrigerator of claim 1, wherein each of the plurality of sleeves is included in a supporting unit disposed over the supporting base, with each of the plurality of sleeves affixed with the mounting block by the respective one of the supporting units being slidably coupled with the mounting block by the first bolt.

5. The refrigerator of claim 1, wherein the cabinet includes an outer wrapper defining an exterior of the cabinet, the exterior including the bottom surface of the cabinet, the cabinet further including one or more mounting blocks receiving respective ones of the plurality of load transducers.

6. The refrigerator of claim 5, wherein the plurality of feet are coupled with respective ones of the mounting blocks and are slidably coupled with the respective ones of the mounting blocks so as to be moveable in a direction normal to the bottom surface of the cabinet into contact with the load transducers.

7. The refrigerator of claim 1, wherein the electronic circuitry is configured to determine the quantity of articles:
    by increasing the quantity of articles when the gross weight of the cabinet increases by a predetermined amount; and
    by decreasing the quantity of articles when the gross weight of the cabinet decreases by the predetermined amount.

8. The refrigerator of claim 7, wherein the electronic circuitry is further configured to associate an article type with the quantity of articles added to the refrigerator or removed from the refrigerator by comparing the associated increase or decrease in the gross weight of the cabinet with a plurality of known product weights.

9. The refrigerator of claim 8, wherein the plurality of known product weights includes a default product weight selected by a classification routine from a plurality of product types with associated respective known product weights.

10. The refrigerator of claim 8, wherein the electronic circuitry is further configured to:
    determine the quantity of articles by dividing the increase in the gross weight of the cabinet by a known product weight of the article type to determine an added quantity; and
    adding the quantity to a previously-determined stored quantity.

11. The refrigerator of claim 10, wherein the electronic circuitry is further configured to:
  determine a net container weight by multiplying the at least one known product weight by the quantity of articles; and
  determine a net fluid weight by subtracting the net container weight from a net stored weight.

12. The refrigerator of claim 1, further comprising:
  a monitoring device directed toward the interior of the cabinet and wherein the electronic circuitry is further configured to receive a signal from the monitoring device and to derive a quantity of the plurality of articles using the signal.

13. The refrigerator of claim 12, wherein the electronic circuitry is further configured to:
  determine a net container weight by multiplying the at least one known product weight by the quantity of the plurality of articles; and
  determine a net fluid weight by subtracting the net container weight from the net stored weight.

14. The refrigerator of claim 1, wherein the electronic circuitry is further configured to:
  determine that a door of the refrigerator is in a closed condition using information obtained from the plurality of load transducers;
determine a condition where the gross weight of the cabinet includes an external object weight attributable to an additional object positioned on the exterior of the cabinet when the door is in the closed condition; and
subtract the external object weight from the gross weight of the cabinet prior to determining a quantity of the plurality of articles.

15. The refrigerator of claim 1, wherein the electronic circuitry is further configured to:
  detect an overweight condition wherein the signal corresponding with the gross weight
of the cabinet and the plurality of articles indicates an excess load condition for the plurality of load transducers; and
output an indication of the overweight condition.

16. The refrigerator of claim 1, wherein the electronic circuitry is configured to detect a predetermined user interaction with the cabinet.

17. The refrigerator of claim 1, wherein the plurality of feet include a corresponding plurality of casters disposed on the lower surfaces of the plurality of feet.

18. An inventory control system for a refrigerator comprising:
  a cabinet defining an exterior configured for resting on a surface and an interior;
  a door affixed with the cabinet and moveable between an open position and a closed position with respect to the cabinet;
  a plurality of mounting blocks disposed in respective locations along a bottom surface of the cabinet and each affixed to the cabinet by at least a first bolt extending through a first hole in the mounting block;
  a plurality of feet coupled with the cabinet along a bottom surface thereof each of the feet including a sleeve defining an upper surface, adjustably supporting a respective lower surface of the foot, and attached to the bottom surface of the cabinet by attachment with a respective one of the plurality of mounting blocks, each by at least a second bolt received in a second hole in the respective one of the plurality of mounting blocks and configured to retain the sleeve with the mounting block such that the sleeve is slidably moveable toward and away from the bottom surface of the cabinet;
  a plurality of load transducers respectively received within a portion of each of the plurality of mounting blocks and disposed between the cabinet and respective ones of the upper surface of a respective one of the sleeves associated with each of the feet, the slidably moveable attachment of the sleeve to the respective mounting block being such that the upper surface of the sleeve is vertically moveable into contact with the respective one of the plurality of load transducers when supported on a surface by the feet to apply respective portions of the gross weight of the cabinet to each of the plurality of load transducers; and
  electronic circuitry including a non-transitory computer-readable medium configured to:
    receive a detection signal from the one or more load transducers;
    determine that the door of the refrigerator is in the open position using information obtained from the plurality of load transducers and determine an inventory change inside of the refrigerator based on a detected change in a gross weight of the cabinet;
    access a stock memory to generate an output indicative of a current inventory in the refrigerator; and
    determine that the door of the refrigerator is in the closed position using information obtained from the plurality of load transducers and determine a condition where the gross weight of the cabinet includes an external object weight attributable to an additional object positioned on the exterior of the cabinet when the door is in the closed position and subtract the external object weight from the gross weight of the cabinet prior to generating the output indicative of the current inventory in the refrigerator.

19. The inventory control system for a refrigerator of claim 18, further including a stock indicator, wherein:
  the stock indicator is configured to display the output indicative of the current inventory in the refrigerator through a remote application.

20. The inventory control system of claim 18, wherein the electronic circuitry is further configured to determine the condition where the gross weight of the cabinet includes an external object weight attributable to the additional object positioned in the exterior of the cabinet by monitoring a state of a door to an interior of the cabinet to determine if a change in the gross weight of the refrigerator coincides with the door being in a closed state that the door is in the open position and that the door is in the closed position using the information obtained from the plurality of load transducers based on a determination of a position of a center of gravity of the refrigerator.

* * * * *